United States Patent [19]

Katsumura et al.

[11] Patent Number: 5,408,633
[45] Date of Patent: Apr. 18, 1995

[54] DATA PROCESSING SYSTEM AND METHOD FOR TRANSFER AND MERGING DATA IN MEMORY CARDS

[75] Inventors: Masataka Katsumura, Funabashi; Akihiro Kawaoka, Kawasaki; Khotaro Yamashita, Machida, all of Japan

[73] Assignee: Hitachi, Ltd., Tokyo, Japan

[21] Appl. No.: 125,505

[22] Filed: Sep. 23, 1993

Related U.S. Application Data

[63] Continuation of Ser. No. 498,942, Mar. 26, 1990, abandoned.

[30] Foreign Application Priority Data

Mar. 29, 1989 [JP] Japan ................... 1-74991
Dec. 25, 1989 [JP] Japan ................... 1-332719

[51] Int. Cl.$^6$ ............................................ G06F 12/02
[52] U.S. Cl. ........................... 395/425; 364/DIG. 1; 235/492
[58] Field of Search ... 364/200 MS File, 900 MS File; 395/400, 425; 235/379, 380, 492

[56] References Cited

U.S. PATENT DOCUMENTS

| | | | |
|---|---|---|---|
| 4,007,355 | 2/1977 | Moreno et al. | 235/379 |
| 4,442,345 | 4/1984 | Mollier et al. | 235/380 |
| 4,641,239 | 2/1987 | Takesako | 235/380 |
| 4,734,569 | 3/1988 | Kawana et al. | 235/380 |
| 4,742,215 | 5/1988 | Daughter et al. | 235/487 |
| 4,748,320 | 5/1988 | Yorimoto | 235/380 |
| 4,767,920 | 8/1988 | Kitta et al. | 235/492 |
| 4,795,898 | 1/1989 | Bernstein et al. | 235/493 |
| 4,798,941 | 1/1989 | Watanabe | 235/380 |
| 4,822,985 | 4/1989 | Boggan et al. | 235/380 |
| 4,864,542 | 9/1989 | Oshima et al. | 365/189.01 |
| 4,877,946 | 10/1989 | Ando et al. | 235/380 |
| 4,912,310 | 3/1990 | Uemura et al. | 235/380 |
| 5,012,074 | 4/1991 | Masada | 235/492 |
| 5,017,766 | 5/1991 | Tamada et al. | 235/492 |

FOREIGN PATENT DOCUMENTS 61-48086 3/1986 Japan .
62-249275 10/1987 Japan .
62-278691 12/1987 Japan .

*Primary Examiner*—Joseph L. Dixon
*Assistant Examiner*—Hiep T. Nguyen
*Attorney, Agent, or Firm*—Fay, Sharpe, Beall, Fagan, Minnich & McKee

[57] ABSTRACT

Computer-based application systems encounter a case in which data must not exist in a plurality of storage devices. This problem emerges typically in translocating data. The invention disclosed here is intended to erase data in its original location promptly after it has been translocated. The invention comprises a memory card containing a processor and a storage device wherein the memory card is connected to an external processing apparatus. In response to a command issued by the processing apparatus, data is erased from the memory card just after it is copied to the processing apparatus. Thereafter, the data stored in the processing apparatus may be transferred to a second memory card.

22 Claims, 22 Drawing Sheets

FIG. 2                                        202

```
    MODE OF
1.  TRANSLOCATION (1) DATA        ☐   (2) DATA   ☐   (3) IN-CARD  ☐
        SENDING             FETCH           MOVE
    ITEMS OF
2.  TRANSLOCATION (1) DATA        : (i)   LOCAL OFFICE NAME      _____
        IDENTIFY:     (ii)  WORK STATION NUMBER    _____
                      (iii) CARD READER-WRITER     _____
                            NUMBER
                      (iv)  CARD NUMBER OR NAME    _____

PARTIAL
    (2) OBJECT OF   : (i)  ALL      ☐   (ii) DATA   ☐
        MOVE:              DATA (3) DATA        : (i)  ITEM   a) ACCOUNT ☐  b) CREDIT ☐
        SPECIFICATION             c) OTHER  _____
                      (ii)  ZONE NUMBER _____
                      (iii) BLOCK         _____
                            NUMBER (4) DATA        : (i)   LOCAL OFFICE NAME      _____
        DESTINATION   (ii)  WORK STATION NUMBER    _____
                      (iii) CARD READER-WRITER     _____
                            NUMBER
                      (iv)  TYPE OF CARD:     ☐       ☐
                            NEW, ACTIVE
                      (v)   CARD NUMBER OR NAME (5) DATA WRITING : (i)  ZONE NUMBER, _____
        STORAGE AREA   (ii) BLOCK         _____
                            NUMBER
    CONDITIONS OF
3.  TRANSLOCATION (1) DATA LENGTH FOR (i)   WHOLE            ☐
        READING /             SPECIFIED AREA   ☐
        ERASURE       (ii)    ITEM UNIT        ☐
                      (iii)   ZONE UNIT        ☐
                      (iv)    BLOCK UNIT       ☐
                      (v)     BYTE UNIT        ☐ — _____ BYTES
```

DATA PROCESSING SYSTEM AND METHOD FOR TRANSFER AND MERGING DATA IN MEMORY CARDS

This is a continuation of application Ser. No. 07/498,942 filed on Mar. 26, 1990, now abandoned.

BACKGROUND OF THE INVENTION

1. The Field of the Invention

This invention relates to a data processing system and a data processing method. More particularly, the invention relates to a system and a method for translocating data between memory cards such as IC cards, optical cards or between storage areas, where the failure to erase the data in the original storage location is impermissible or causes an unfavorable result.

2. Description of the Prior Art

In the past, when data stored on a memory card is translocated to another memory card and the data on the original source memory card needs to be erased., three functions (i.e., reading, writing and erasure,) are carried out individually.

In this specification, the meaning of erasure of data is similar to deletion or annulity of data.

Namely, the data is first read out of the source card by means of a card reader-writer, the data is stored temporarily in the work station, the data is written to another card, and finally the data which has just been copied is erased from the source card.

Similarly, in moving data among storage locations in the same card, the data stored on the card is first read out, it is written to another storage location in the card, and thereafter the data which has just been copied is erased from its original storage location.

Conventional techniques merely implement the erasure of the translocated data left in the original location at the end of a series of processings.

There exists a technique of automatically erasing data, which is stored in a memory card, under a special condition. In this technique (disclosed in JP-A-62-278691), the storage device on the memory card is formed of a nonvolatile storage and a volatile storage. A timer provides time limits for information stored in the nonvolatile storage. Information with its time limit having expired is erased automatically.

Another invention (disclosed in JP-A-62-249275) is intended to prevent illegal transactions by erasing the personal identification number of the memory card on expiration of a certain time or on completion of a trade.

JP-A-61-48086 discloses the erasure of data following a data translocation to another card. Here, data of only a necessary number of persons is translocated from an IC card to another IC card through the IC card data transfer connectors, and the translocated data left on the source IC card is erased.

SUMMARY OF THE INVENTION

An object of this invention is to realize a method and system, based on a simple procedure, for performing the erasure of data immediately and automatically following data translocation.

Another object of this invention is to provide a memory card which facilitates data translocation.

Other objects of this invention will become apparent from the following description of specification and accompanying drawings.

The above-mentioned objectives are based on the following recognition, by the inventors of this invention or of the foregoing prior art deficiencies.

In the foregoing conventional technique, sequential procedures are required for performing the data translocation from a memory card to another memory card. Because of the independent nature of these procedures (reading writing and erasure) the erasuring operation can be erroneously overlooked.

Because of its special nature, data is not allowed to exist in two locations at the same time (i.e., these data must be erased after being read out). The failure to erase this data after translocation can cause serious damage of business or such unfavorable events as the illegal use of data or the leak of its content.

For other data, the presence of data which has been translocated and is now needlessly remaining in the original storage area can cause the erroneous use of the data, the disruption of data management, and the uneconomical use of storage areas.

In order to achieve the above-mentioned objectives and to overcome the foregoing prior art deficiencies, the present invention provides a card data processing system comprising a memory card which incorporates a central processing device and a storage device, and a card-oriented information processing system which reads out data stored in the memory card. Data which has been read out of the memory card is supposed to be erased from the memory card. The card itself or the information processing system provides a processing program or circuitry for data translocation and which erases data just after it is read out. The information processing system has a translocation service program which, at data reading, writes the readout data to other storage area and initiates the translocation processing program.

The data read-out function of the information processing system includes data translocation from an source memory card to another memory card, data translocation between storage areas within a memory card, and data translocation to other storage location. There are two cases in which data is stored in or on the memory card.

As a preferable form of practice, the information processing system is constituted by a central processing unit which connects to a memory card through a card reader-writer, and a work station having an external storage area. In this arrangement, the translocation service program is stored in the central processing unit of the work station, and it functions to operate the translocation processing program and write data, which has been read out of the memory card, to a specified storage area of the memory card.

Although in the following explanation the storage device is a memory card, it may also be a semiconductor memory or a magnetic memory such as a magnetic disk or magnetic tape. Furthermore, the storage device may be an optical memory card or optical disk. This invention is essentially independent of the recording medium and the recording scheme.

For reading data out of the source memory card, i.e., in the case of data translocation to other card or to another storage areas in the same card, the operator inserts the card in the card reader-writer or the like and specifies the data to be read, conditions and instructions. In response to this action, the translocation service program starts operating the translocation processing program upon the source card, so that the specified items of data are read and erased. Accordingly, during a data read-out process, in which data recorded in the memory card is not allowed to exist in two locations at the same time, the erasure of the source data is accomplished surely and efficiently.

The following describes data translocation between memory cards where the information processing system for reading is constituted by a card reader-writer and a work station. The operator inserts a source card and a new receiving card in respective card reader-writers. The operator enters instructions with respect to the data translocation items, conditions and the execution to the work station. When the translocation service program of the work station starts operating, it initiates the translocation program in the source card so that the specified data items or data in the specified storage area is read out and the data left in the storage area is erased. The data which has been read out is stored temporarily in the source work station, and then transferred to the receiving work station. The data received is written to the specified storage area of the new card in accordance with the specified conditions by the write process program in the card which is connected to the work station through the card reader-writer.

Data processing identical to that described above can be accomplished by means of a volatile storage for storing data which needs to be erased after being read out of the memory card and a switch which is operated by the translocation program for erasing the data following the data reading.

BRIEF DESCRIPTION OF THE DRAWINGS

FIG. 2 is a diagram showing a screen of entries for specifying data translocation items and conditions on the work station in the embodiment of FIG. 1:

DESCRIPTION OF THE PREFERRED EMBODIMENTS

Some data, after translocation, is required to be erased from its original storage area. Such data include that which is not allowed to exist in a plurality of locations at the same time, and data of which the failure to erase can cause serious damage to business, illegal use, or a leak of secret information.

Some data is not granted transcription and duplication without a special procedure. Such data include information relating to copyrights, and data relating to trade secrets and privacy. This data further includes data that is to be protected because of the cost expended in its creation process, its originality and its idea.

In handling this type of data, many processing problems can be solved by viewing the data as tangible goods. In addition, data content can be secured.

Viewed this way, the translocation of data from one storage area to another storage area accompanied by automatic erasure can conceptually be seen as similar to the physical transfer of tangible goods.

The transcription of data, which is the existence of the same data in two storage locations, is considered to be the only allowable production of the data after the prescribed procedure.

Reformation of data is considered data which is subjected to a qualitative change such as by being merged with other data.

Upon reformation of data, when the source data coexists unchanged after the reformation process, it can conceptually be considered as a material piece or part or a new product.

The reformation using a plurality of same data is conceptually considered in such a way that data identical to the source data is produced separately for use as it is needed.

In reformation of data, if the source data is needed to be left in the original storage area, it can be considered in such a way that data identical to the source data are produced and used as data for reformation.

The erasure of data from the original storage area following translocation, transcription, or reformation is not considered by the prior art to be a special process. On the contrary, the prior art considers that allowing the data to remain instead of being erased is a special process.

In real world data processing, source data is retained in a great proportion, and the practical application of the above concept requires an additional expense and manpower. Implementing the foregoing will prevent faulty and illegal actions in data processing.

The following describes the embodiments of this invention in conjunction with the drawings and by taking examples of data processing which follows the translocation of data stored on a memory card to another storage area.

Figure 1:
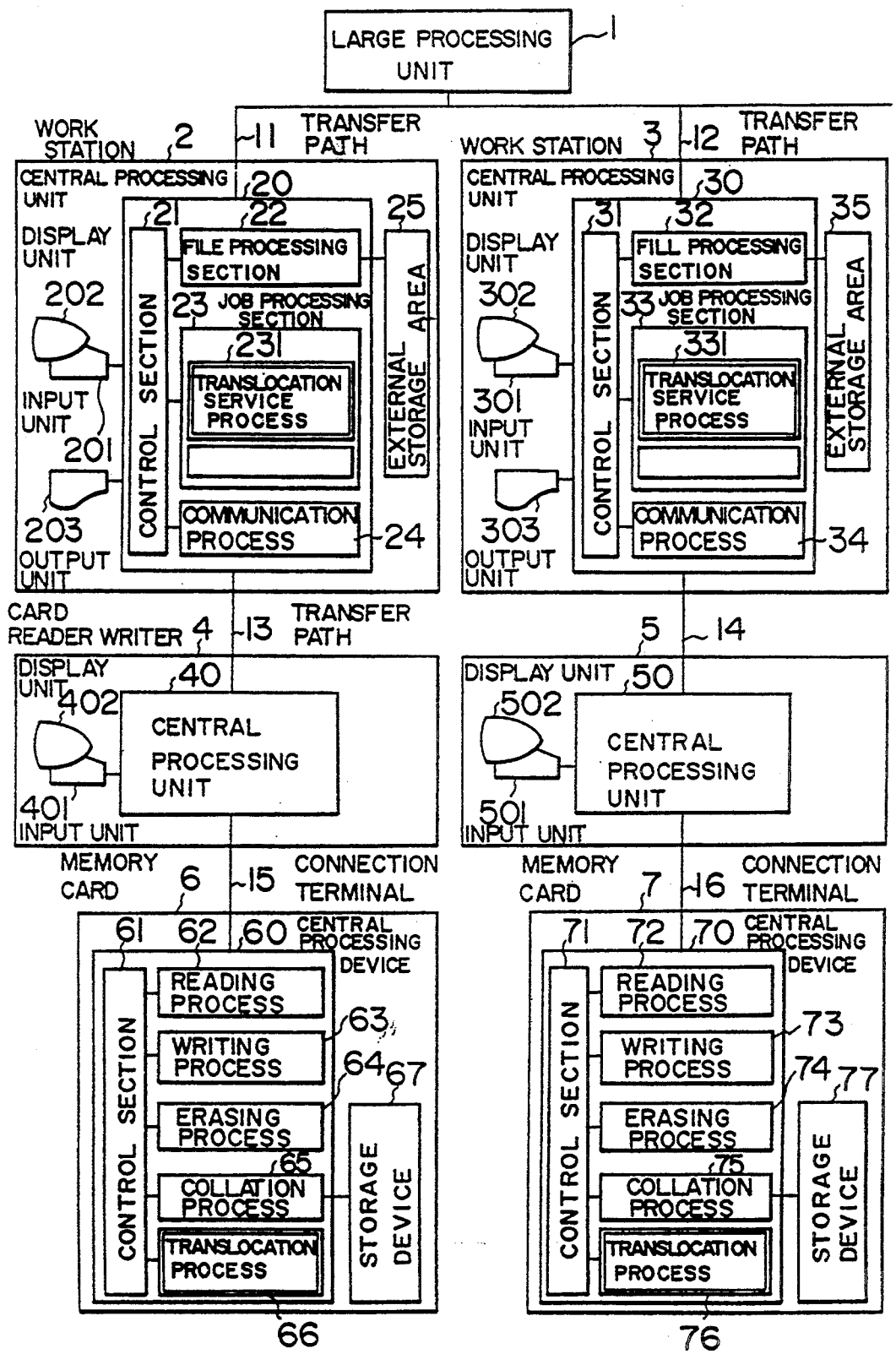
FIG. 1 is a block diagram of an embodiment of the inventive card data processing system.

FIG. 1 is a block diagram of an embodiment of the inventive card data processing system. In the Figure, indicated by 1 is a large processing unit, 2 and 3 are work stations connected to the large processing unit 1, 4 and 5 are card reader writers connected to the work stations 2 and 3, respectively, 6 and 7 are memory cards to be placed in the card reader-writers, 11, 12, 13 and 14 are transfer paths, and 15 and 16 are connection terminals.

The large processing unit 1 controls the card data processing system.

In the following explanation, the work station 3, card reader-writer 5 and memory card 7 have the same arrangements as the work station 2, card reader-writer 4 and memory card 6, and their detailed explanation will not be repeated.

The large processing unit 1 comprises a central processing unit and an external storage area.

The work station 2 comprises a central processing unit 20, an external storage area 25, an input unit 201, a display unit 202 and an output unit 203.

The central processing unit 20 executes the programs for a control section 21, file processing section 22, job processing section 23, communication processing section 24, etc.

Among these sections, the job processing section 23 executes particular job processes by using basic programs for reading, writing, erasure, collation, translocation, etc. resident on the memory card.

A translocation service program 231 which forms part of the job processing section 23 functions to move data between memory cards or between different storage areas on the same memory card.

FIG. 2 shows an example of entries on the screen of the display unit 202 for data translocation and conditions to be entered on the input unit 201 for carrying out the data translocation in accordance with the translocation service program 231.

The translocation service program 231 may be one with a function in which for the same data translocation items and condition for many cards, specifications are fixed to those entered first, and successive processes of data translocation are carried out continuously in accordance with the fixed specifications.

In addition, the translocation service program 231 may be one with a function of data translocation in which the translocation data from one or more memory cards on the data source side are stored temporarily in the work station 2, and thereafter the data are written to one or more memory cards on the data receiving side sequentially one at a time or simultaneously in parallel in accordance with the specified data translocation and conditions.

By the provision of the translocation service program 231 with the above-mentioned functions, it becomes possible to distribute data from one memory card to a plurality of memory cards, collect data from a plurality of memory cards to one memory card, sort data from a plurality of memory cards to a plurality of memory cards, and exchange data among memory cards, in accordance with the specified data translocation and conditions.

Data translocation by the translocation service program 231 may take place not only between memory cards, but also between the storage device of a memory card and the external storage area of the work station or large processing unit, or from the storage device of a memory card to the output unit (in this case, the output data is the translocated data).

The job processing section 23 ray be one which introduces data, which has been stored in a memory card on the data receiving side, to the work station temporarily, and merges the data into data translocated from a memory card on the data source side to the work station, and thereafter rearranges both data in a specified order and writes the data into the card on the data receiving side.

The external storage area 25 stores tables for running the translocation service program 231 in accordance with the input from the input unit 201, and data related to the job processing section 23.

Figure 3:
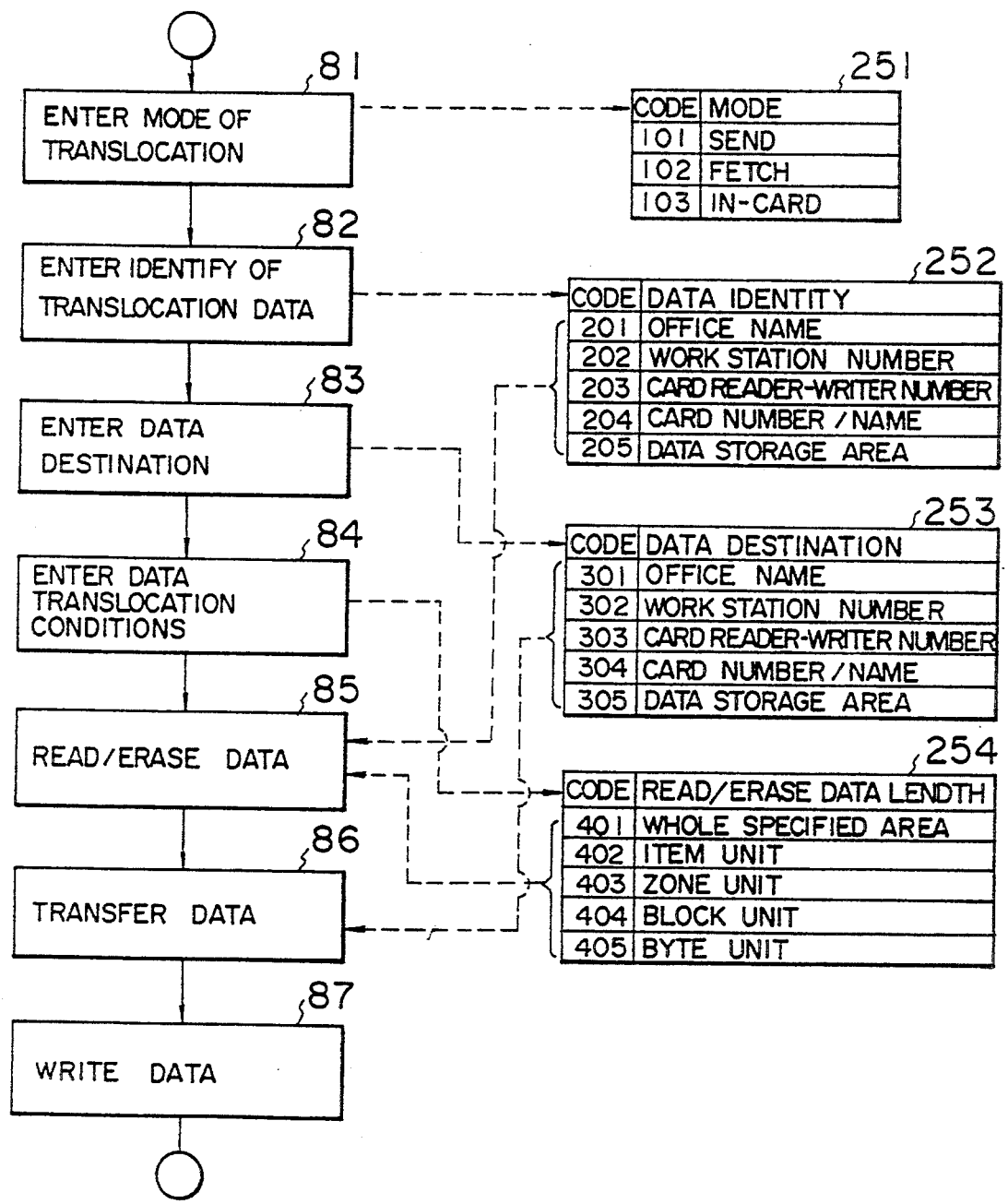
FIG. 3 is a diagram including a flowchart of the data translocation program and tables used in the process of the embodiment of FIG. 1.

FIG. 3 shows, in correspondence to the processing steps of this embodiment which will be described later, the tables formed in the external storage area 25.

Translocation mode specification table 251 specifies the mode of data translocation (step 81).

Translocation data specification table 252 specifies the location of the source data to be translocated when "sending" (code 101) is specified in step 81. Based on this specification (step 82), the intended data is read out of the storage area 67 of the specified memory card 6, and it is erased (step 85). The erasure includes the clearing of data and the setting of a specified value or code (e.g., NULL), and it further includes such a case, which is virtually identical to the data erasure, of the movement of the pointer that indicates the address of the data writing area.

Translocation destination table 253 specifies the destination of the translocated data (step 83). Based on this specification, the data read out through the translocation data specification table 253 is transferred to the specified work station (step 86), and written into the specified storage area 77 of the memory card 7 (step 87).

Translocation condition specification table 254 reads data and specifies an arbitrary data length for the erasure (step 84 and step 85).

The card reader-writer 4 in FIG. 1 is connected to the work station 2, and it comprises a central processing unit 40, an input unit 401 and a display unit 402.

The card reader-writer 4 may be one which comprises a card feeder detachable to the card reader-writer 4 for transporting memory cards, one at a time, to the card reader-writer, and a stack which sequentially stacks memory cards processed by the card reader-writer 4, although it is not shown in the Figure. In this case, the card feeder comprises a control section, a communication section and a card transportation section. The control section controls the card transportation section in response to the translocation service program 231 of the work station 2 which is received through the communication section and information from the central processing unit 40 of the card reader-writer 4.

The card reader-writer 4 may be incorporated in the work station 2. In this case, the central processing unit 40, input unit 401 and display unit 402 can be substituted by the counterparts of the work station 2.

The memory card 6 in FIG. 1 is connected to the card reader-writer 4 through the connection terminal 15, and it comprises central processing device 60 and a storage device 67. The connection terminal 15 is merely required to connect the memory card 6 to the card reader-writer functionally, and it does not need to be a complete connector. It may be an optical storage device.

The central processing device 60 executes such programs as a read process program 62, write process program 63, erasure process program 64, collation process program 65, and translocation process program 66. The control section 61 controls the read process program 62, write process program 63, erasure process program 64, collation process program 65, and translocation process program 66 in accordance with the information from the work station 2 received through the card reader-writer 4.

The translocation program 66 operates in accordance with the commands from programs such as the translocation service program 231 of the work station 2 included in the job processing unit 23, and reads data out of the storage device 67, erases the data after reading, and delivers the data to the card reader-writer 4. This function may be performed in the central processing unit 40 of the card reader-writer 40.

The data reading and erasing processes of the translocation program 66 can take place in an arbitrary data length, such as a but, zone or block of the storage device 67, or an item of stored data.

The above explanation has been centered on the work station 2, card reader-writer 4 and memory card 6. The central processing unit 30, external storage area 35, input unit 301, display unit 302 and output unit 303 are identical to the counterparts of the work station 2. Furthermore, the programs of the control section 31, file processing section 32, job processing section 33 and communication processing section 34 and the translocation service program 331 executed by the central processing unit 30 are similar to those executed by the central processing unit 20.

The central processing unit 50, input unit 501 and display unit 502 which form the card reader-writer 5 are identical to those of the card reader-writer 4. Also in the memory card 7, the central processing device 70 and memory device 77, and the programs 71-76 executed by the central processing device are identical to those of the memory card 6.

Figure 4:
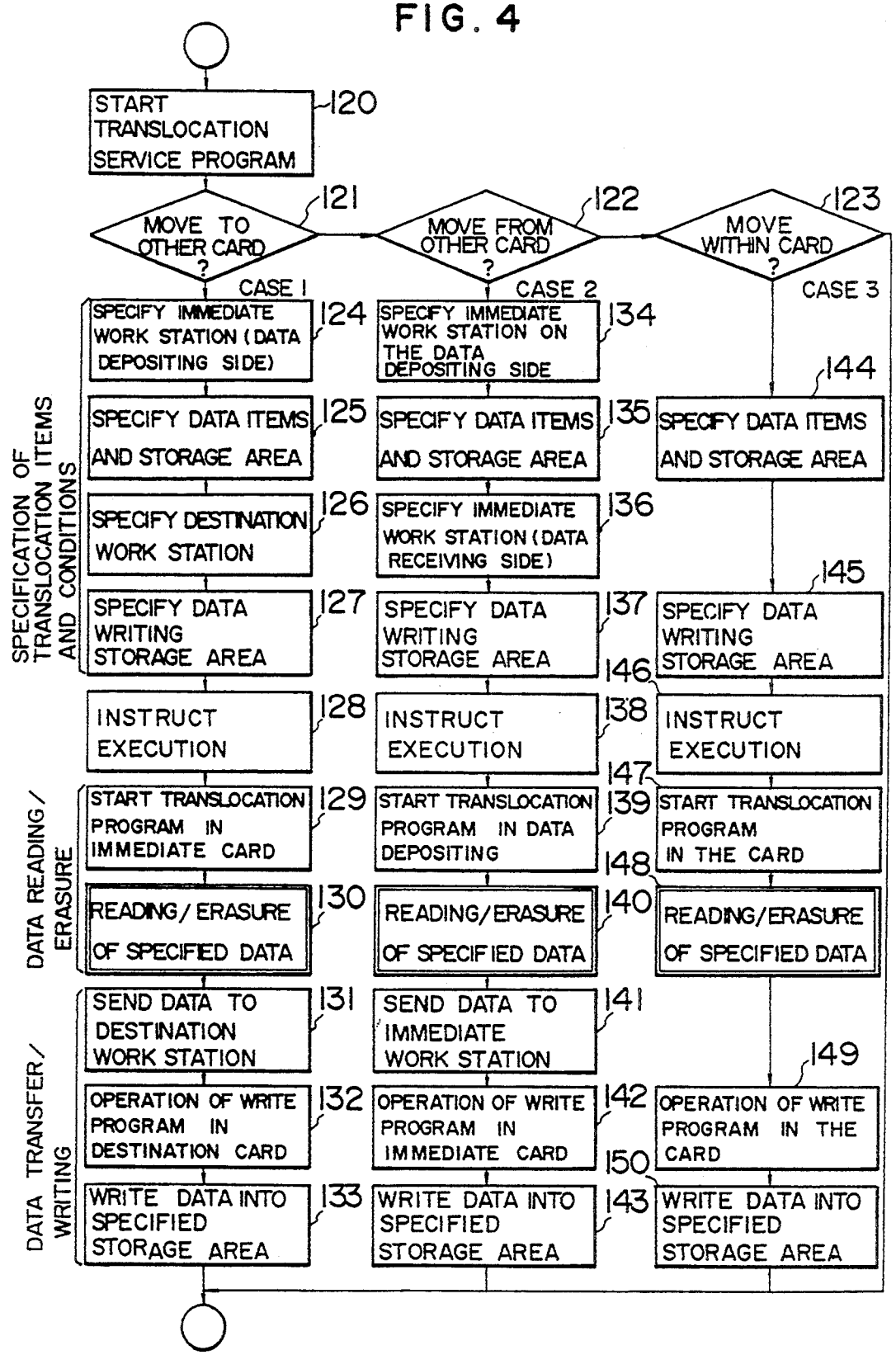
FIG. 4 is a flowchart showing an embodiment of the inventive card data processing method.
Figure 5:
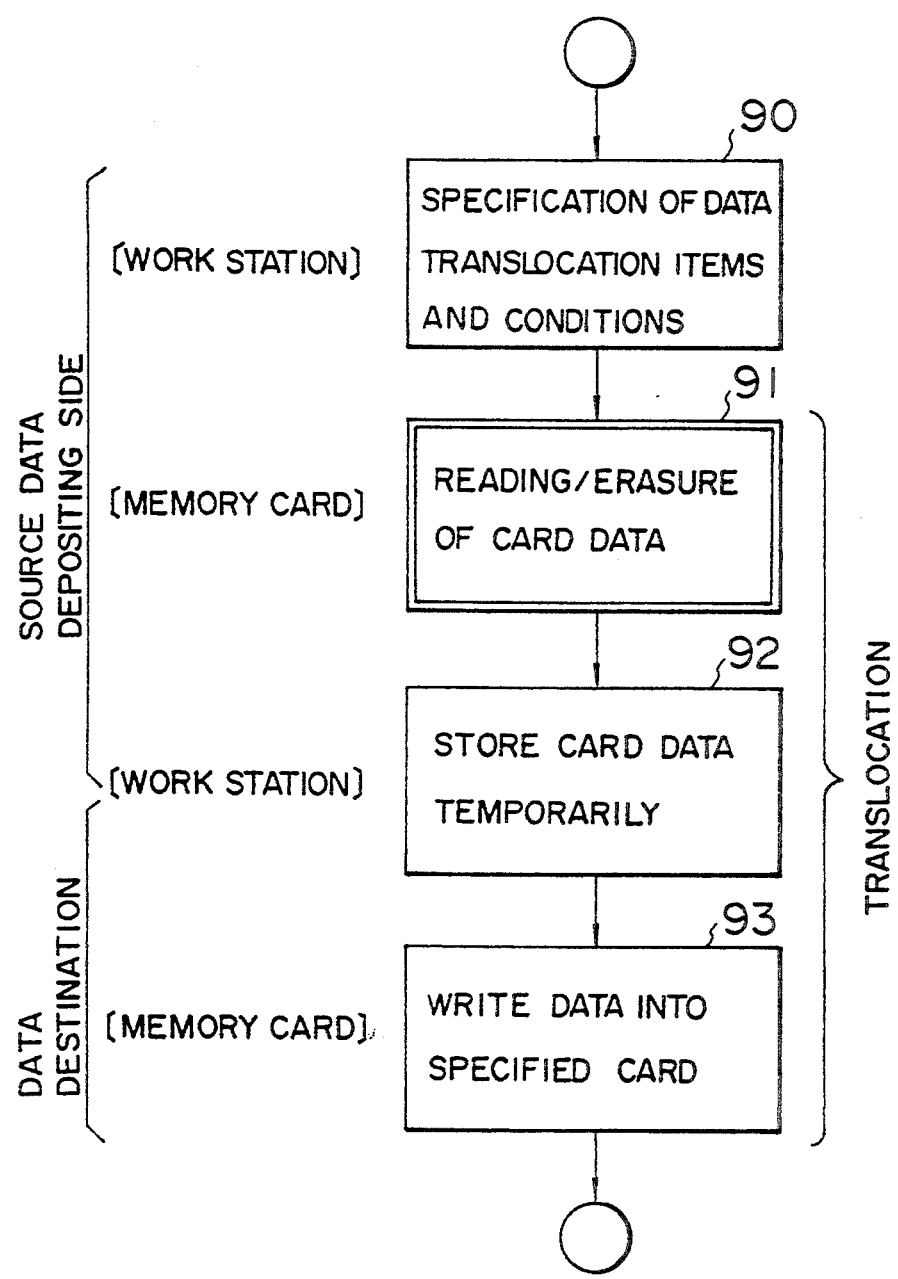
FIG. 5 is a conceptual diagram showing the inventive card data processing method.

FIG. 4 is a flowchart of the data processing based on the inventive card data processing method implemented by the foregoing card data processing system. FIG. 5 is a conceptual diagram of the method. The card data processing method of the case of translocating data in an source memory card 6 to another memory card 7 will be explained with reference to FIG. 5 in connection with the embodied system of FIG. 1.

In case there arises a need for translocation (hereinafter referred to as "move") of data stored in the memory card 6 to another memory card 7, the operator inserts the memory card 6 on the data depositing side into the card reader-writer 4. The operator specifies, on the work station 2, the storage area 67 in which the data or data item to be moved is stored, the numeric code of the destination work station 3, the storage area 77 of the memory card 7, etc. (step 90 in FIG. 5). An example of the specification screen is shown in FIG. 2.

In response to the instruction of execution of data processing, the intended data is read out of the memory card 6 and erased by the translocation service program 231 executed by the central processing unit 20 of the work station 2 and the central processing device 60 of the memory card 6 (step 91 in FIG. 5).

The translocation service program 231 starts the translocation program 66 on the memory card 6, transfers the readout data to the specified work station 3 and starts the write process program 73 on the memory card 7 thereby to write the readout data to the specified storage area.

The translocation program 66 has a function of reading specified data out of the memory card 6 and simultaneously or immediately thereafter erasing the data in response to the command from the work station 2.

The readout data is stored temporarily in the work station 2 by the translocation service program 231 (step 92 in FIG. 5), and thereafter it is delivered to the specified work station 3 over the transfer paths 111 and 12 and to the data destination. The write process program 73 on the memory card 7 which is inserted in the card reader-writer 5 in connection with the work station 3 is started, and the transferred data is stored in the specified storage area of the storage device 77 (step 93 in FIG. 5).

The processes based on this invention include: (1) data translation from a memory card 6 (data source side) to a memory card 7 connected to another work station 3 (case 1); (2) data translocation to a memory card 6 (data receiving side) from a memory card 7 connected to another work station 3 (case 2); (3) translocation of data stored in one storage area to another storage area within the same memory card 6 (case 3).

The above item (2) may involve data translocation to/from memory cards other than the memory card 6 and memory card 7 connected to the other work station 3. The above case 1, case 2 and case 3 correspond to the sending, fetching and in-card data movement in the table 251 selected in response to the entry of the mode of translocation (step 81) in FIG. 3.

In data translocation within the memory card 6 of the above item (3), readout data for translocation is stored temporarily in the memory card 6.

The process will be explained in more detail using FIG. 4. Initially, the operator starts the translocation service program 231 in the work station 2 (step 120). The translocation service program 231 produces the screen shown in FIG. 2 on the display unit 202. In accordance with this display, the operator enters the mode sought to be translocated the items of translocation and the conditions of translocation. Items of entry will become apparent from the following explanation of the process.

In response to the selection of the translocation mode, any of the above-mentioned case 1, case 2 or case 3 is chosen (steps 121-123). When data sending is selected, the control sequence branches to the process of case 1 at step 121. When data fetching is selected, the control sequence branches to the process of case 2 at step 122. When in-card moving is selected, the control sequence proceeds to the process of case 3.

The process of case 1 will be explained.

The operator specifies or identifies a work station 2 in connection with the memory card 6 in which data to be moved is stored (step 124) and the identification of data to be moved (step 125), in response to the prompt on the screen of FIG. 2. The operator enters the items of the translocation data specification table 251 shown in FIG. 3.

Next, the operator specifies a destination work station 3 (step 126), and specifies a writing area for the data (step 127). The operator enters the items of the translocation destination specification table 253 in response to the prompt on the screen of FIG. 2.

Following these entries, the operator enters the execution instruction of the process (step 128). Then, the translocation program 66 in the memory card 6 is started (step 129), and the data specified in step 125 is read out of the memory card 6 and erased (step 130). Next, the readout data is transferred to the destination work station over the transfer path 11 (step 131). The write process program 73 in the target memory card 7 is started (step 132), and the data is written into the specified storage area (step 133). These steps 131-133 are executed in accordance with the setup of the translocation destination specification table 253. The steps 124-133 are executed in accordance with the data length which is set in the translocation condition specification table 254.

Steps 134-143, which are the process steps of case 2, are similar to the process of case 1, although information related to the data source and data destination differs when seen from the commanding work station, and explanation thereof will be omitted.

Steps 144-150, which are the process steps of case 3, are similar to the process of case 1, except for the step of specifying a work station and the step of data transfer between work stations. Here, there is data movement within the same memory card, and they are not required to be processed. The storage device 67 is an area for storing active data used for the data processing. The storage device 67 may include an area for storing the history of data translocation and the status of data in the device, in addition to the area for the active data.

By introducing the foregoing functions to the data processing of the memory card 6, data can be moved easily and accurately among memory cards or among storage areas, whereby negligence and illegal data access due to the forgotten erasure of data in the storage area of the data source can be prevented. In addition, the independency and originality of data.

An embodiment of the inventive memory card processing system and the associated processing method have been described, but this invention is not confined to this embodiment.

Specifically, although the executions of programs have been explained for work station 2 and memory card 6, it is arbitrary for each application of the system how to divide the whole program function between the work station 2 and the memory card 6. For example in a case where the memory card 6 does not have a central processing device 60, all programs are executed by the work station 2. Naturally, some program-based functions may be shared by the card reader-writer 4.

Figure 6:
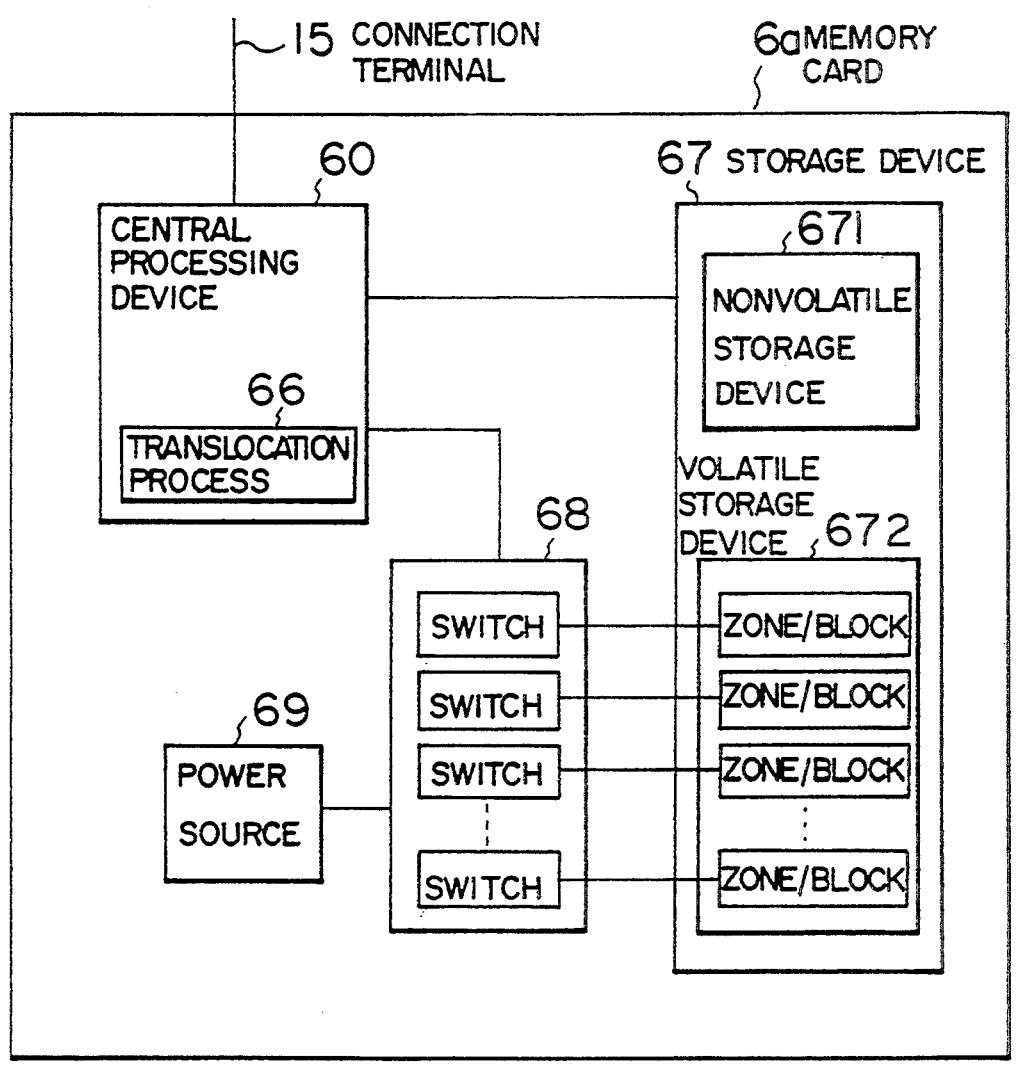
FIG. 6 is a block diagram of an embodiment of the inventive memory card.
Figure 7:
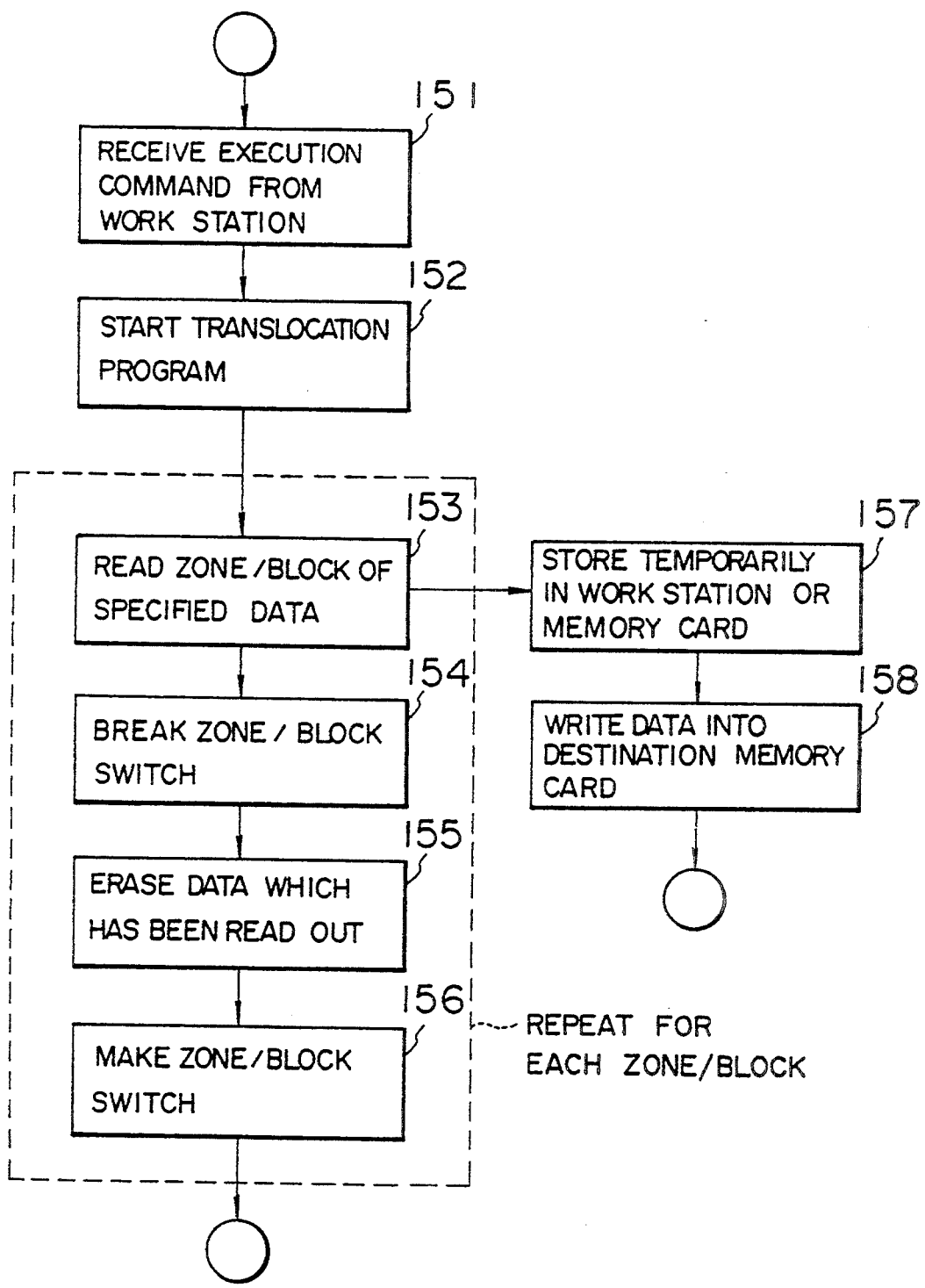
FIG. 7 is a flowchart showing the card data processing method which uses the embodiment of FIG. 6.

FIG. 6 shows another embodiment of the arrangement of a memory card 6a used for the inventive memory card processing system. FIG. 7 is a flowchart of the process implemented by the memory card 6a shown in FIG. 6.

Figure 8A:
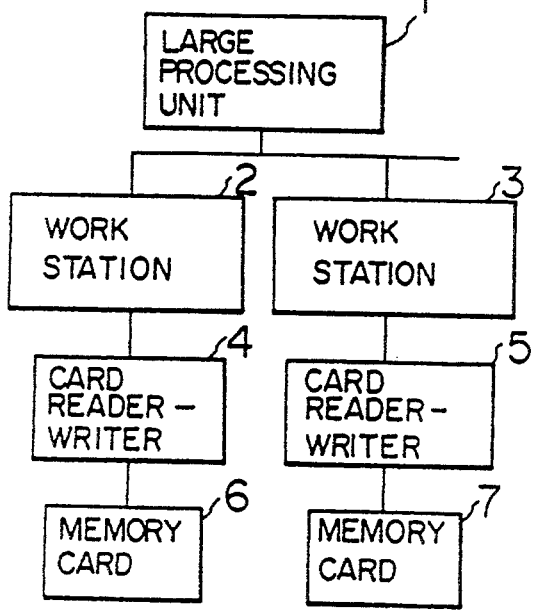
FIGS. 8a-8d are a set of block diagrams showing variation of the inventive card data processing system.
Figure 8B:
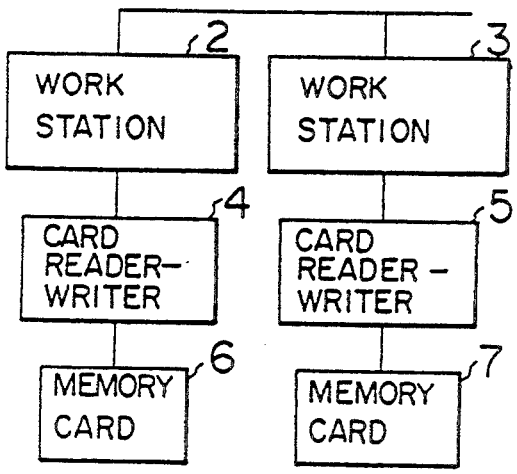
Figure 8C:
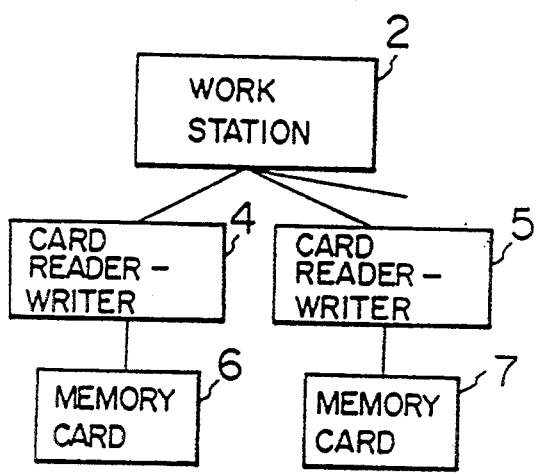
Figure 8D:
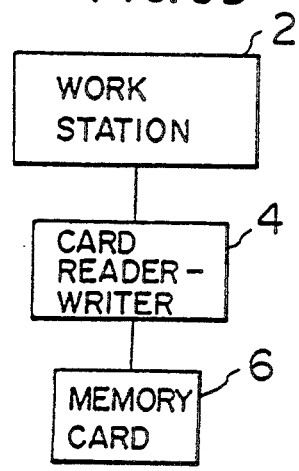

Data reading and erasing by the memory card 6a may be carried out by, in a storage device 67, a volatile storage device 672 for storing data which needs to be erased after translocation, switches 68 provided in units of storage such as zones or blocks of the storage device 672 and operated by the translocation processing program 66 of the central processing device 60, and a power source 69 for retaining data stored in the volatile storage device 672 when the card is not inserted in the card reader-writer, in which case data in the specified zone or block is read out (step 153) in response to the data translocation command (step 151 and step 152) from the work station, the switch which connects to the zone or block of the data is opened after data reading (step 154) so that the data is erased (step 155), and following the data erasure the switch 68 is closed again (step 156) thereby to enable data writing. The switch 68 may be of any type, such as a transistor switch, capable of interrupting the power supply from the power source 69. The step 157 and step 158 are processes carried out by the work station, in which the readout data is stored temporarily and thereafter it is written to the target memory card. FIG. 8A is a simplified diagram of the whole system shown in FIG. 1. The overall arrangement of the system may be one which does not use a large processing unit 1 as shown in FIG. 8B, but may be one in which a work station 2 is connected with more than one card reader-writer 4 as shown in FIG. 8C or may be one which is formed of a work station 2 and a card reader-writer 4 as shown in FIG. 8D. Among these arrangements, the system of FIG. 8D is designed for data translocation among data storage areas in the memory card. Individual components of these systems will be apparent from the foregoing explanation.

Although the embodiment described above is the case of using work stations and card reader-writers, the system may be an integral arrangement of these units.

The following describes some examples of application to show a deeper understanding of this invention.

(1) Example of data translocation to a geographically distant place

Figure 9:
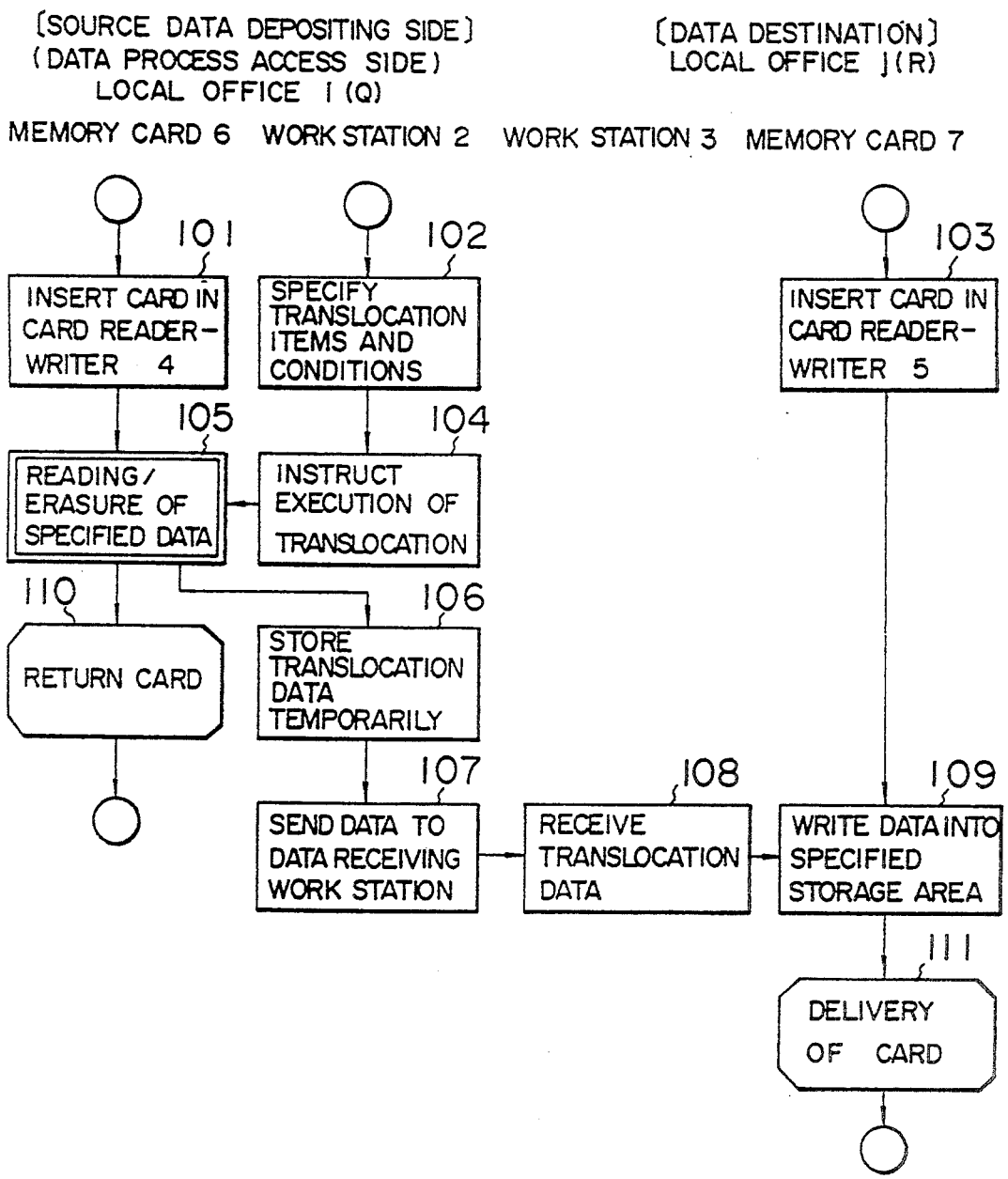
FIGS. 9 to 21 are flowcharts used to explain the embodiments of the inventive card data processing method and system.

FIG. 9 is a flowchart of the process of this invention as it is applied to data translocation to a geographically distant place. The embodiment will be explained with reference to FIGS. 1 and 9.

A company employee A becomes aware of not having his bank card issued by X bank when he arrived in R city. The X bank performs such transactions with customers as the account services, credit services and cash services on the IC card.

The company employee A is in immediate need of his bank card which was left at home.

The company employee A telephoned his (or her) home in Q city and asked his family member to bring the bank card to the nearby local office i of the bank and let the bank staff transfer the card to a local office j in R city.

Upon arrival of the family member with the memory card 6 (bank card), the bank staff employee BS inserts the card 6 into the card reader-writer 4 of the immediate card data processing system (step 101), and instructs the family member to enter the personal identification number on the input unit 401 thereby to check the legitimacy of the card bearer. Subsequently, the BS enters, on the input unit 201 of the work station 2, the translocation items and conditions for the data stored in the memory card 6 (step 102). In the local office j in R city, if a particular memory card is not specified for data translocation from the other local office or main office, a new memory card 7 is set automatically in the card reader-writer 5 of the card data processing system (step 103).

On the part of the local office i, the BS executes data translocation upon confirming that the work station 3 in the local office j is ready to receive data (step 104). Data stored in the storage device 67 is read out in accordance with the translocation service program 231 of the work station 2 and the translocation program 66 on the bank card 6 and then immediately erased (step 105), and it is sent to the work station 3 over the transfer paths 11 and 12 by way of the work station 2 (step 106) according to the communication processing section 24 (step 107).

The data received by the work station 3 (step 108) is stored in the specified storage area of the storage device 77 according to the translocation service program 331 and the write process program 73 located on the new bank card 7 which is inserted in the card reader-writer 5 (step 109).

The data which has been stored on the bank card, i.e., that was brought to the local office i by the family member of the company employee A, is already erased at this time point, and the card 6 is returned to the local office i (step 110).

The company employee A goes to the local office and enters the personal identification number on the input unit 501. If the entered number matches with the personal identification number of the bank card 7, he is given the bank card 7 which replaces the one that was left at his home (step 111).

Consequently, data translocation between the memory cards 6 and 7 connected to the different work stations can be carried out promptly without duplication of data and without physical transportation.

(2) Example of data translocation from a geographically distant place

Figure 10:
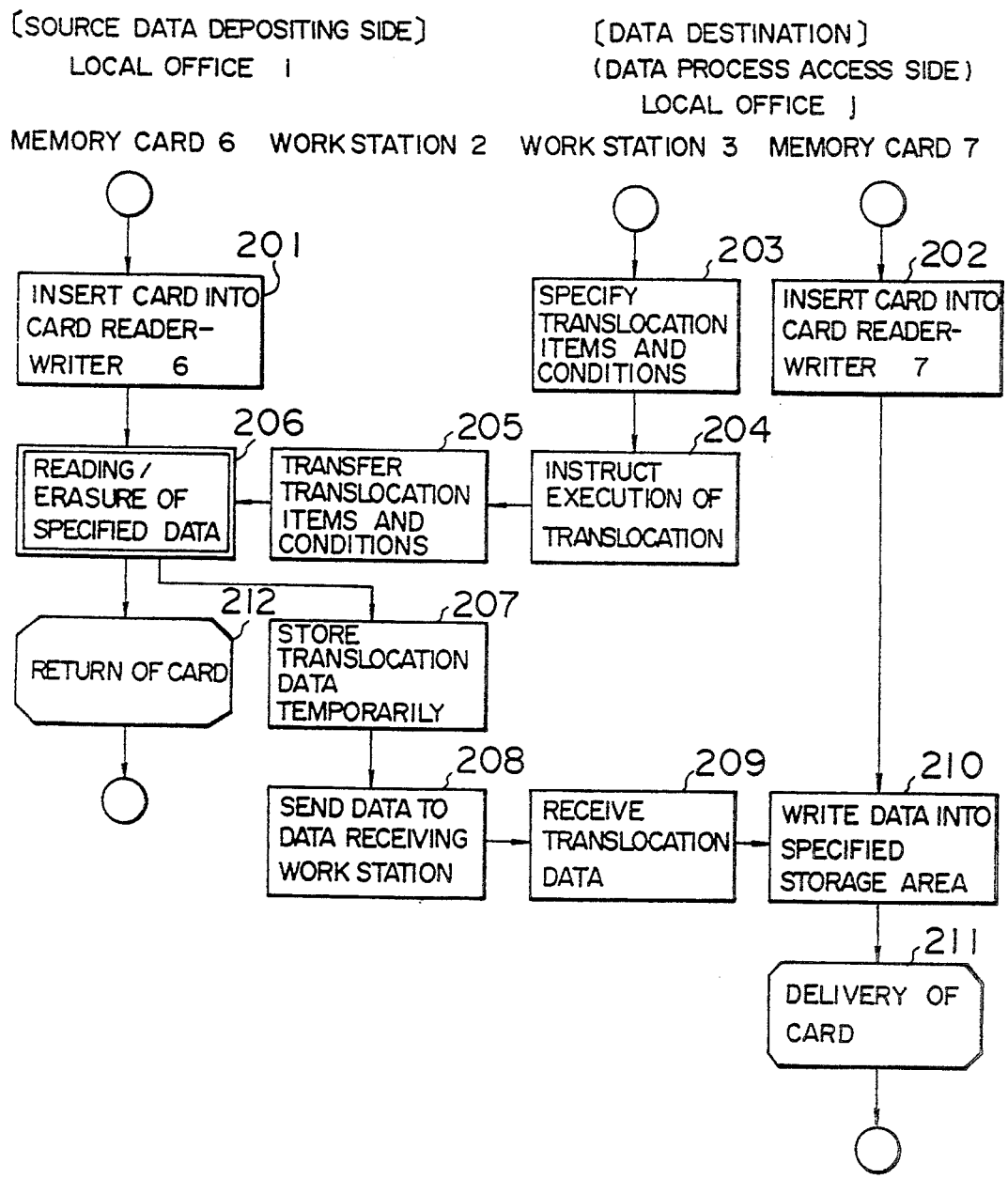

A conceivable case is to specify the data translocation items and conditions on the part of the receiver so as to fetch data from a memory card 6 on the data depositing side. FIG. 10 shows an example of this case.

In the preceding example, the company employee A did not have geographical knowledge of R city to locate the local office of X bank in it, and therefore he phoned his home in Q city and instructed his family member bring the bank card 6 to the local office i of the X bank.

In the local office i, the bank staff employee BS inserts the memory card 6 in the card reader-writer 4. After recognizing the bearer who was requested to enter the personal identification number on the input unit 401, the BS keeps the memory card 6.

The company employee A was thinking about looking for a local office of the X bank in city S where he is going next if there is no local office in R city. But knowing the presence of a local office j of X bank in R city, the company employee A went to the local office and asked the office to transfer the bank card 6 which should have been brought to the local office i by his family member.

By being prompted by the local office j, the BS of the local office i takes out the bank card 6, which has been kept, into the card reader-writer 5 again (step 201).

The staff in the local office j inserts a new bank card 7 in an immediate card reader-writer 5 (step 202), and specifies the data translocation items and conditions on the work station 3 (step 203).

The execution command from the local office j (step 204) is received by the work station 2 of the local office i (step 205). Data is fetched from the card 6 (steps 206 and 207), and it is sent to the local office j (steps 208 and 209).

The data received by the work station 3 is written into the storage device 77 of the new card 7 which is inserted in the card reader-writer 5 (step 210).

The staff of the local office j asks the company employee A to enter the personal identification number on the input unit 501 which is in direct connection with the card reader-writer 5 and, upon personal identification verification, gives the newly produced bank card 7 to him (step 211). The whole data stored on the card 6 which was brought to the local office i by the customer's family member is already erased, and the card is returned to the bank (step 212).

Consequently, data specified by the receiver can be moved from a memory card on the data depositing side, even though it is in a remote place, without the duplication of data.

In the foregoing two examples, it is also possible to move only a specified part of data stored on the bank card 6. In this case, the bank card 6 brought to the local office i has its data, which has been moved to the local office j, erased, and the rest of the data is returned unchanged to the card bearer. Part of the data which imposes no problem by being present in two locations may be sent and received in the form of simple transcription together with the translocation data.

In the same procedure as described above, data translocation can be initiated by a work station other than that on the data depositing side or data receiving side.

(3) Example of continuous data translocation process for many cards

Figure 11:
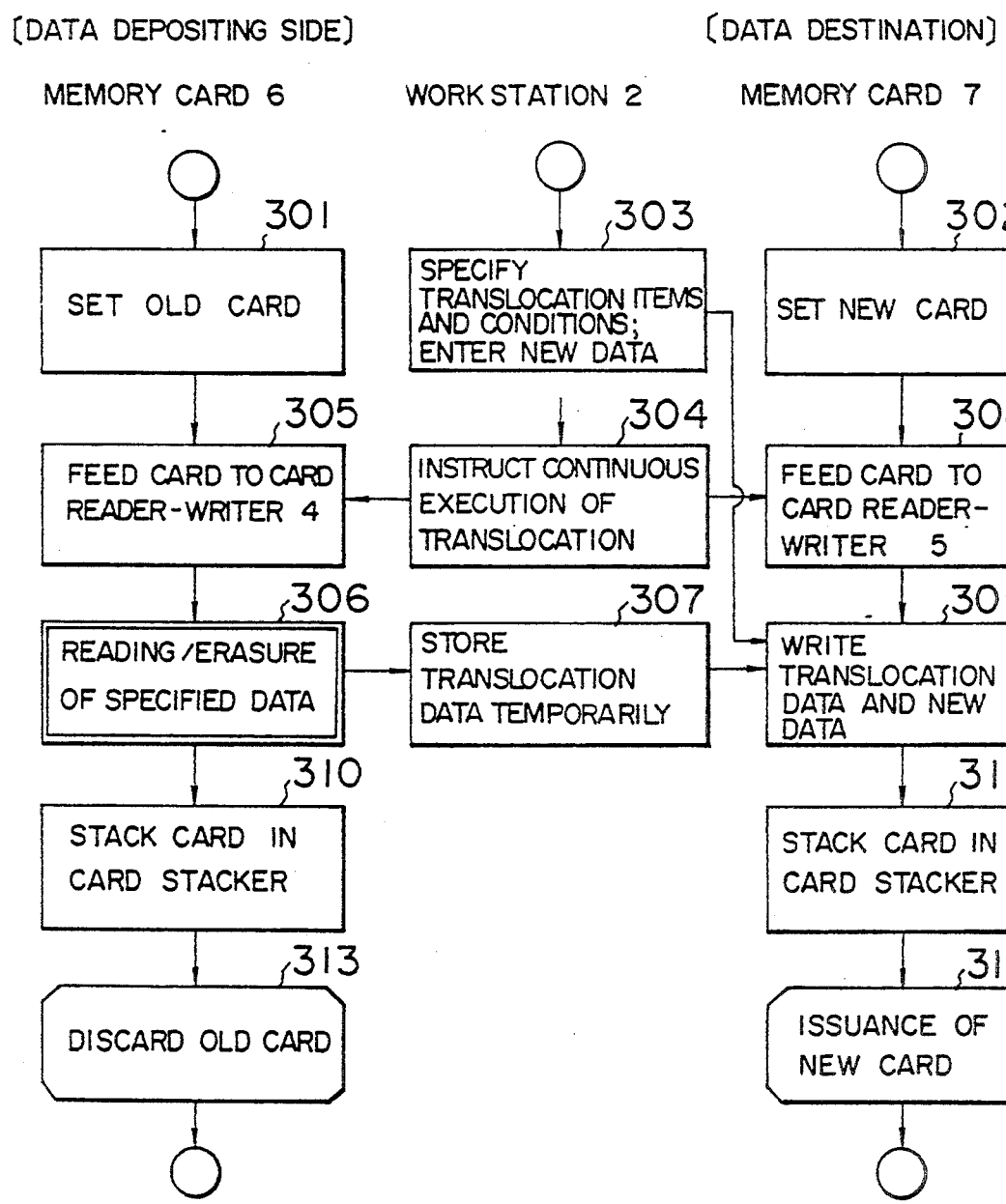

The following explains an embodiment of this invention in which data stored in a large number of memory cards are moved continuously to different cards on a single work station, as shown in FIG. 11.

Some memory cards, such as credit cards, student identification cards, audience cards and membership cards, need to be updated at a certain time interval.

A card data processing system as shown in FIG. 8C is assumed. The work station 2 is connected with card reader-writers 4 and 5, with the card reader-writer 4 operating on the data depositing side and with the card reader-writer 5 operating on the data receiving side.

The card reader-writers 4 and 5 are each 5 equipped with a card feeder which inserts unprocessed cards continuously, one card at a time, to the card reader-writer, and a card stacker which stacks processed cards sequentially. These facilities operate in union with the central processing unit 20 of the work station 2 and the central processing units 40 and 50 of the card reader-writers 4 and 5.

The job processing staff sets old cards which store source data in the card feeder on the source card side (step 301), and sets new cards on the card stacker on the target card side (step 302).

The employee enters, on the input unit 201 of the work station 2, the specification of the items and conditions of data to be moved from old cards to new cards, and enters data which is newly written to the new cards (step 303). The newly written data may have been stored in the external storage area 25 in advance.

Next, the employee instructs the continuous execution of the data processing (step 304). Each old card is fed to the card reader-writer 4 on the data depositing side and inserted in it (step 305). Then, the card starts its translocation program 66, which reads relevant data items or data in the data storage area out of the storage device 67 and thereafter erases the data (step 306).

The readout data is stored temporarily in the central processing unit 20 of the work station 2 (step 307), and it is written together with newly added data to the specified storage area of a new memory card 7 which is set sequentially on the card reader-writer 5 on the data receiving side (steps 308 and 309).

The old card and new card for which data translocation process has completed are in the stackers equipped on both card reader-writers (steps 310 and 311).

The new cards are issued and delivered (step 312), and the old cards are discarded (step 313).

The foregoing embodiment may be modified for data translocation among cards treated on different work stations.

Consequently, the jobs for rewriting items on old cards to new cards and issuing the cards are rationalized and at the same time against the illegal use of old cards.

(4) Example of data translocation to an output unit

Figure 12:
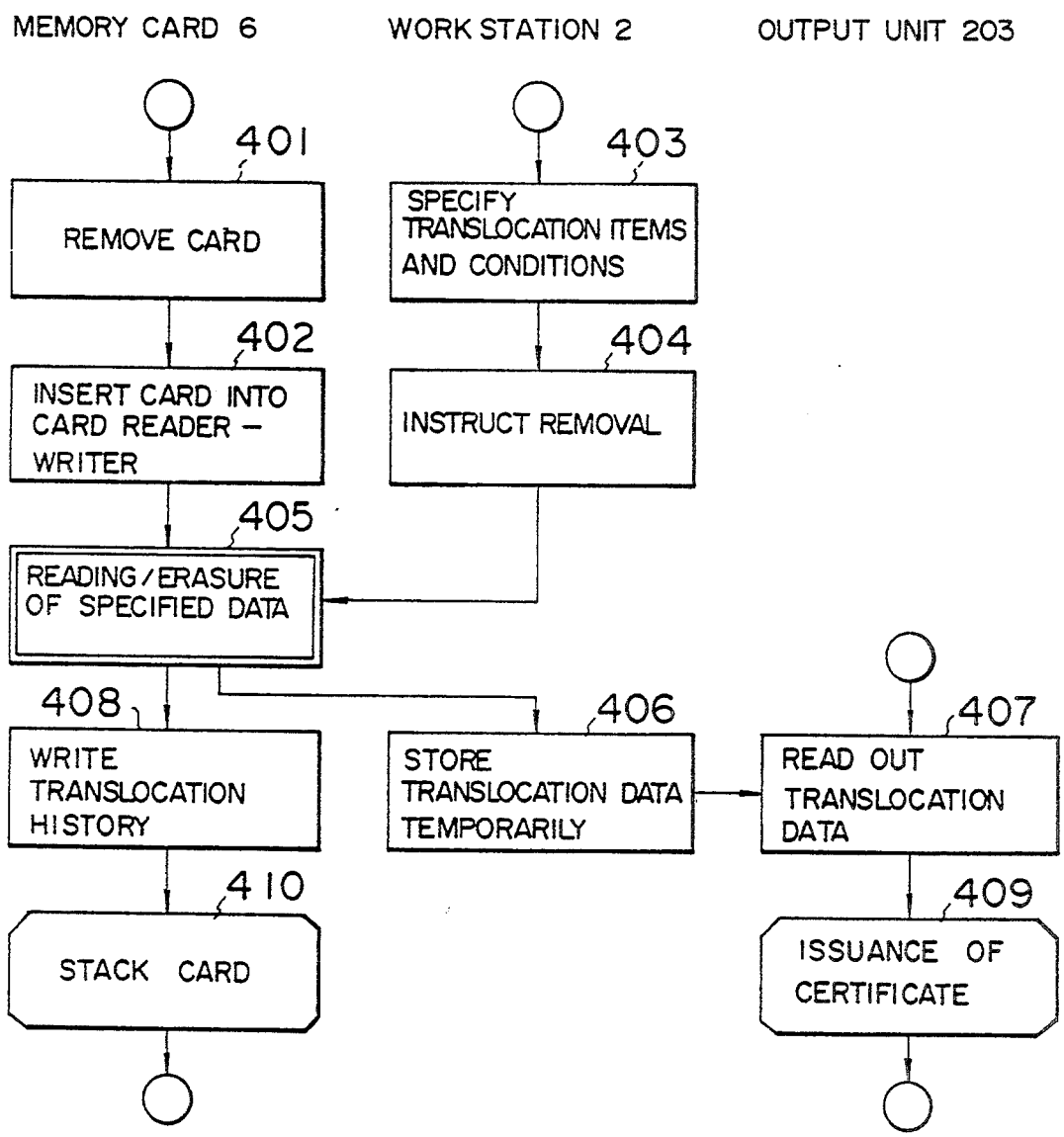

FIG. 12 shows in flowchart form an embodiment of this invention in which data stored in a memory card 6 is printed on the output unit 203 under control of the work station 2 and the card reader-writer 4 connected to it.

In one city, the citizens have services of census registration, resident registration, seal impression registration and so on based on the family card (IC memory card) 6 issued to each family. The family card functions as a source register for such registered items as the census registration, and also stores the history of alteration of these items and the history of issuance of various certificates.

A member of a family living in this city is going to move to other city, and he (or she) went to the city hall and filled the entries of the move-out notification form.

Upon receiving the form, the employee of the city hall extracts the relevant family card 6 from the stack (step 401), and inserts it in the card reader writer 4 connected to the work station 2 (step 402).

Next, the staff enters the items necessary on the input unit 201 of the work station (step 403), and executes (step 404).

The function of the translocation service program 231 of the work station 2 operates on the translocation program 66 of the family card 6 to read resident registration items such as the name, date of birth, and current resident address out of the storage device 67 (step 405), and print necessary data on the form which is already set on the output unit 203 (steps 406 and 407).

Among the items related to the resident registration recorded on the family card 6, portions of the move-out person has been erased automatically during the read-out process, and the history of alteration is newly recorded (step 408).

The printed form delivered from the output unit 203 is sealed by the employee, and issued as a certificate of move-out (step 408). Other items such as the legal residence of the move-out person are not altered and are left unchanged in the family card.

The staff removes the card 6 from the card reader-writer 4, and keeps it in the original stack (step 410).

Consequently, data which is not allowed to exist in two locations can is erased in the original storage area in response to the notification of move-out. At the same time, the system prevents the leak of personal confidential information and while speeding service.

(5) Example of data translocation within a memory card

Figure 13:
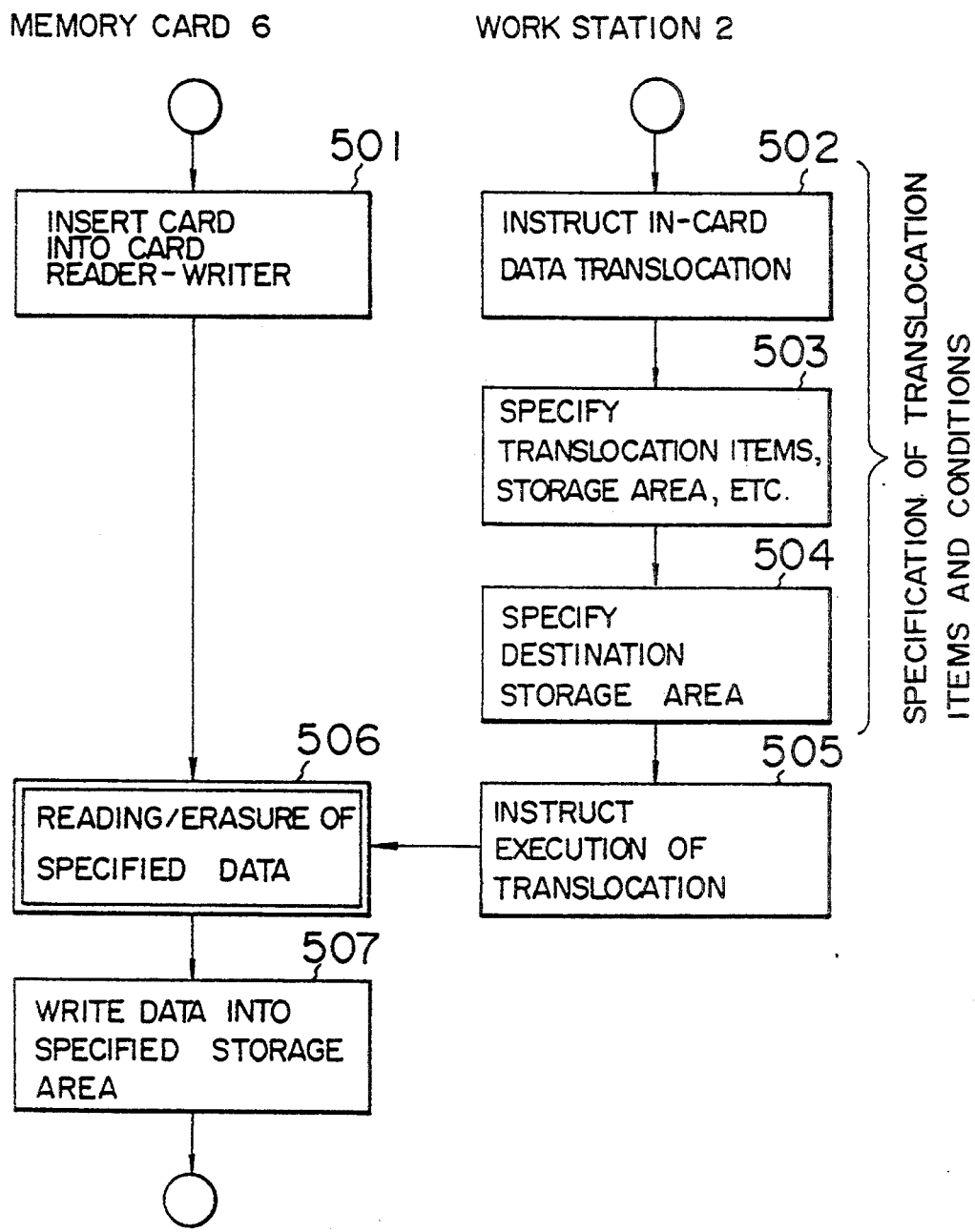

FIG. 13 shows in flowchart form an embodiment of this invention which is applied to the data translocation within the same memory card using the card processing system shown in FIG. 8D.

An IC card 6 has a storage device 67 lacking in the storage space for one data item, and it needs to move the whole data item to another storage area.

The operator inserts the card 6 in need of data translocation into the card reader-writer 4 (step 501). Next, the operator specifies the data translocation items and conditions on the input unit 201 of the work station 2 in connection with the card reader-writer 4.

For the items and conditions, the operator first specifies the data translocation within the IC card 6 which is inserted in the card reader-writer 4 connected to the work station 2 (step 502). Subsequently, the operator specifies items of data or data storage area to be moved, the interval of data reading and erasure (step 503), and specifies the storage area for the data destination (step 504). Finally, the operator executes the data translocation (step 505).

In response to this procedure, the translocation program 66 in the card 6 reads out data to be moved and erases the data in its original storage area (step 506).

The readout data is stored temporarily in the work station 2. Thereafter it is written into the specified storage area of the card 6 according to the function of the write process program 63 (step 507). The readout data may be stored temporarily in the memory card 6, instead of being stored temporarily in the work station 2.

A similar method enables data to be relocated to an unused area of the storage area, or overwritten to an area where unimportant data is now stored.

By equipping the card reader-writer with the card feeder and card stacker described in the preceding embodiment, it becomes possible to carry out data translocation processing for many memory cards.

Data stored in the memory card 6 may be destined to a large processing unit I or to the external storage area of the work station 2.

Consequently, data translocation which has been previously done by individual operations of read, erase and write functions can be performed automatically with one operation. It is also possible to prevent trouble in job such as the failure to erase data.

(6) Example of partial data translocation

Figure 14:
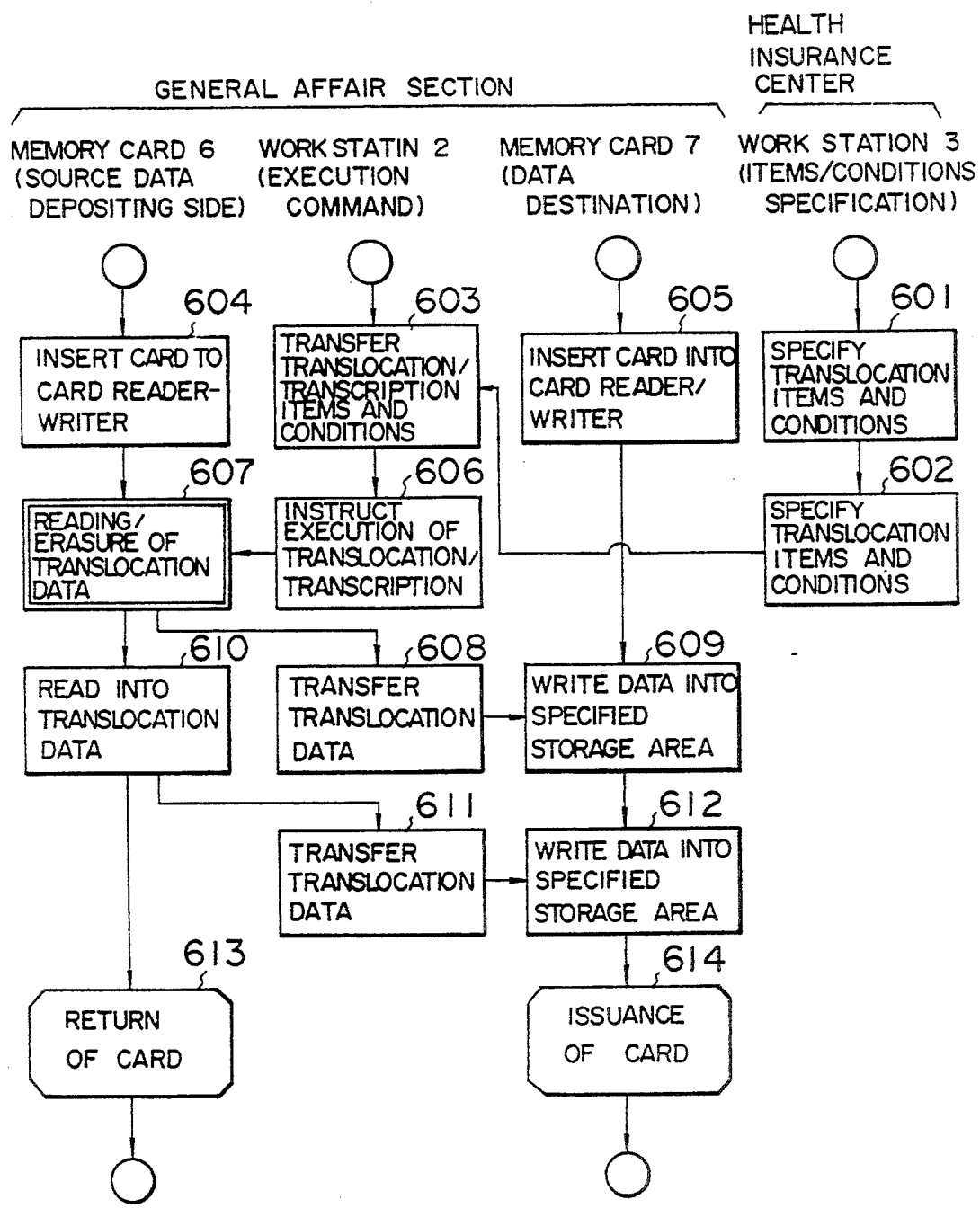

FIG. 14 shows an embodiment of this invention in which only part data stored in a storage area of a memory card is moved to another memory card.

The nation-wide cooperative health insurance uses an IC card for its health insurance card. This card can record items such as anamnesis, medical treatment and fee for medical treatment, as well as the use record of the health insurance card.

An employee B of a firm Y which is a member of the cooperative health insurance has family dependents who are listed on the insurance card, and he has requested a staff person of the general affair section of the business establishment, where he belongs, to issue a health insurance card for family who will be inhabiting a distant place.

The staff person wrote a form of approval for issuing the health insurance card for family member who will be inhabiting a distance place, and sends the form by facsimile together with a copy of resident registration of the new residence of B's family member brought by B to the health insurance center.

The general affair section has a work station 2, which is connected to work stations in the firm including that of the health insurance center. The health insurance center has a work station 3. The work station 2 of the general affair section is connected with two card reader-writers 4 and 5 in the configuration shown in FIG. 8C.

Upon receiving the facsimiled documents from the staff of general affair section, the staff person of health insurance center implements the prescribed procedure in the center, and thereafter telephones the staff person of general affair section to notify the execution of procedure.

The staff person of health insurance center enters the type of issuance of the health insurance card, data to be translocated, data destination, etc. on the input unit 301 of the work station 3 (step 601). Data items that are to be transcripted to the new health insurance card for family who will be inhabiting a distance place are specified, although the name and address of employee B who is a member of insurance are not included in the translocated data (step 602). The input information is sent to the work station 2 (step 603).

Following the telephone contact from the center, the staff person of general affair section inserts the health insurance card brought by B into one card reader-writer 4 in connection with the work station 2 (step 604), inserts a new IC card 7 in stock into another card reader-writer 5 (step 605), and executes the process on the input unit 201 (step 606). In this embodiment, the data translocation items and conditions cannot be specified or altered on the input unit 201.

In response to the execution command, all data pertinent to the moving family member, among data stored in the health insurance card 6 inserted in the card reader-writer 4, is read out of the storage area 67 by the translocation service program 231 of the work station 2, the translocation program 66 in the health insurance card 6, and the write process program in the health insurance card 7. Thereafter the data is erased (step 607), and it is moved to the storage device 77 of the new health insurance card 7 inserted in the card reader-writer 5 (steps 608 and 609).

The data items to be transcripted are also recorded in the specified area of the storage device 77 by the job processing section 23 of the work station 2, the read process program 62 in the health insurance card 6, and the write program 73 in the health insurance card 7 (steps 610, 611 and 612).

The newly issued health insurance card for the family member who will be inhabiting a distant place 7 is given together with the original health insurance card 7 (steps 613 and 614).

The foregoing data translocation between the health insurance cards 6 and 7 may be modified such that the data translocation items and conditions are specified on the work station 2 of the general affair section, and the approval of issuance is instructed on the work station 3 of the health insurance center. The system may be a closed one within the general affair section, comprising only a work station 2 and card reader-writers 4 and 5.

Consequently, data processing in which the data translocation process and other processes such as data transcription, are mixed, can be carried out concurrently while retaining the sole existence of translocated data.

(7) Example of translocation from many cards

Figure 15:
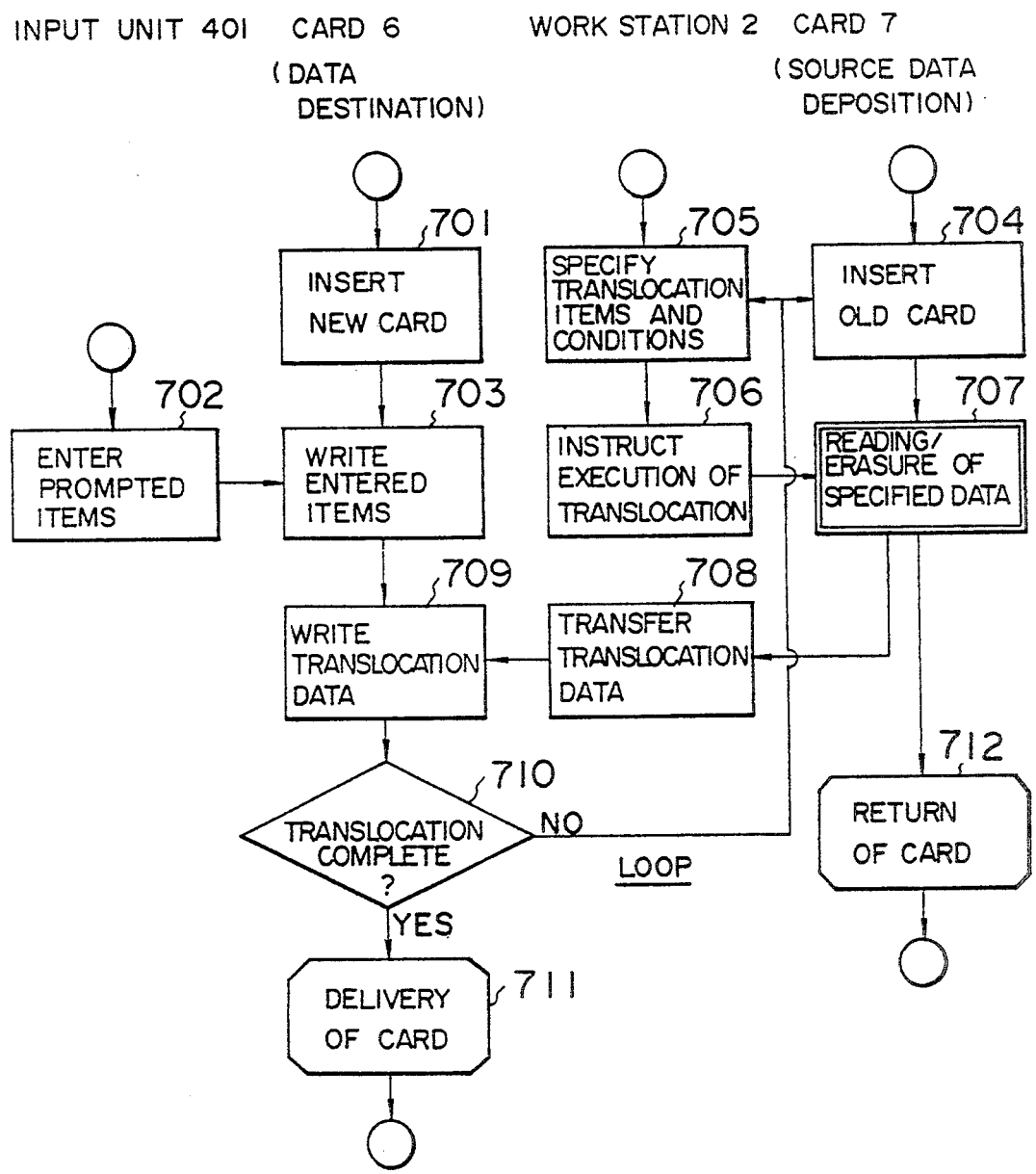

FIG. 15 shows an embodiment of this invention in which divided data stored in a plurality of memory cards is moved to another card.

A bank 2 performs transactions with customers such as account services, pay-out services and cash services on the bank card which is IC card.

A retailer Mr. C who is a customer of 2 bank wants to clarify the income and expense of his store operations by opening an account two previously used bank cards are unified into the new card.

Mr. C went to a local office of Z bank, and explained his intention and handed the two old bank cards to a counter staff person.

Every local office of 2 bank performs such job processings as issuance and cancellation of bank cards on the work station 2 and a plurality of card reader-writers connected to it. The work stations 2 in all local offices are under control of a large processing unit 1 installed in the computer center of the main office.

The counter staff person inserts the two cards into the immediate card reader-writer 4, and lets Mr. C enter his personal identification number on the input unit 401 to confirm the card bearer.

The counter staff person removes search old cards from the card reader-writer 4, and inserts a new bank card 6 in it (step 701). Next, the staff requests Mr. C to enter items such as the personal identification number and account name for the newly opened account on the input unit 401 (step 702). The input data is directly written to the new bank card 6 (step 703). The counter staff inserts again one of the Mr. C's old cards into the card reader-writer 5 (step 704), and specifiers the data translocation items and conditions from the old card to the new card on the input unit 201 (step 705).

In response to the execution of data translocation taken by the counter staff on the input unit 201 (step 706), the translocation program 76 on the old card 7 is started in accordance with the translocation service program 231 of the work station 2, and the whole data stored in the storage device 77 is read out erased from its storage area (step 707) transferred by way of the work station 2 (step 708) and written into the storage device 67 of the new card 6 inserted in the card reader-writer 4 (step 709).

The same process takes place for the second old card of Mr. C. Namely, the first card is removed from the card reader-writer 5, the second card is inserted in it, and the foregoing steps 705 to 709 are repeated sequentially (step 710).

Upon unification of two cards into one card, for items which need calculation (balance of deposit, balance of loan, etc.), pertinent data is read out to the work station 2 again for the implementation of calculation after translocation and the results are stored back to the card 6 in accordance with the job processing section 23.

On completion of data translocation to the new card 6, the content of these data processings is sent automatically to the large processing unit 1, in which the two old accounts of Mr. C held in the associated external storage area are deleted, and the new account is opened.

The new bank card 6 is given to Mr. C (step 711), and the two old cards are returned to the bank (step 711).

Figure 16:
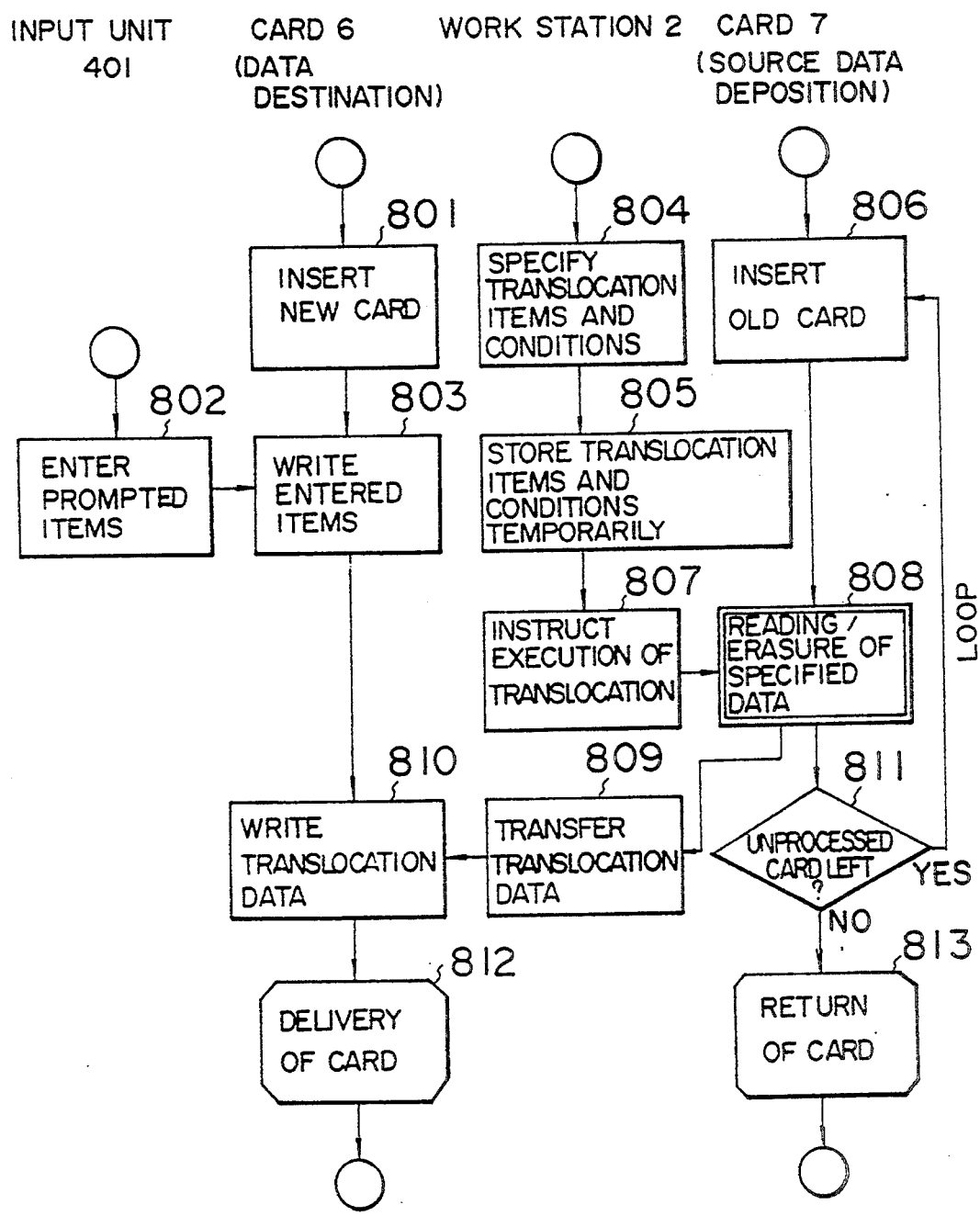

In the case of data translocation from a plurality of cards to another card based on the same items and conditions as of the foregoing embodiment, an alternative method may be that the translocation service program 231 is provided with holding in the work station 2 the data translocation items and conditions, which are specified at the beginning, until the end of translocation processes for all cards so that the same items and conditions are applied to the data translocation processes following the first card (steps 801-813), as shown in FIG. 16.

Consequently, it is possible to collect data, distributed in a plurality of memory cards, into another card continuously without the occurrence of omission and falsification.

(8) Example of unification of many cards

Figure 17:
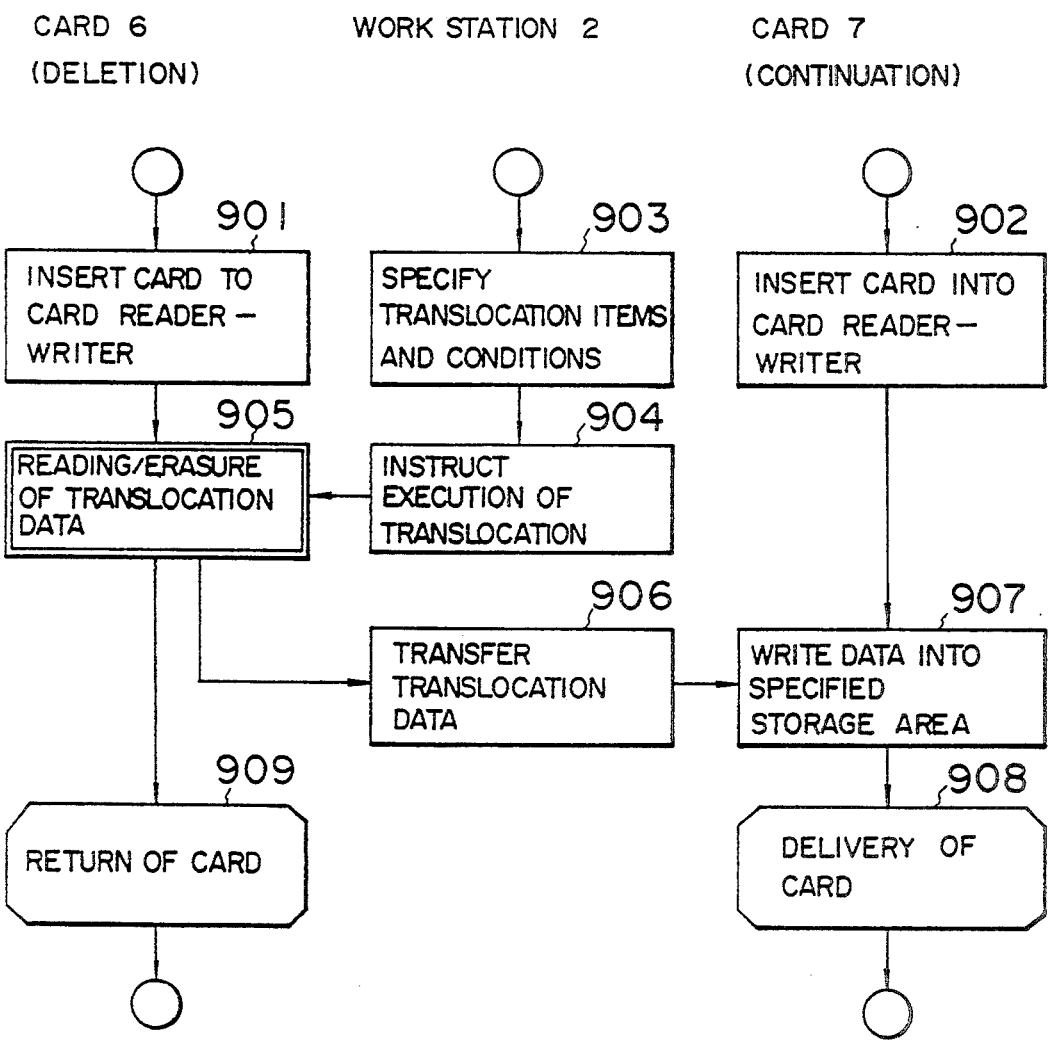

FIG. 17 shows an embodiment of this invention in which data distributed in a plurality of memory cards are collected into one card.

Mr. C, who appeared in the preceding embodiment, has decided to unify two bank cards family members including that of his wife into one bank card of his wife.

Following the prescribed procedure including personal confirmation based on the personal identification number, the counter staff person of Z bank inserts the bank card 6 to be cancelled into the card reader-writer 4 (step 901), and subsequently inserts the other cards 7 of Mr. C's wife into the card reader-writer 5 (step 902).

Following the specification of the data translocation items, conditions for card unification and the instruction of execution of data translocation by the counter staff person on the input unit 201 (step 904), the translocation service program 231 of the work station 2, the translocation program 66 in the bank card 6 and the write process program 73 in the bank card 7 start operating. The translocation data in the bank card 6 is stored in the storage device 77 of the card 7 (steps 905-907). Calculations necessary for data translocation are included in the function of the job processing section 23.

Part of data recorded in the card 6, such as the denomination of card, address, etc. which is not moved to the card 7, is left in the card 6, or alternatively if security is a primary consideration, the job processing section 23 of the work station 2 may be provided with a function of erasing data after translocation so that the erasure program 64 in the bank card 6 is operated in accordance with the specification of data to be erased together with the data translocation items and conditions in step 903.

The data is moved to the target card 7, with the priority order among data being appended thereto in advance. In this case data translocation may be based on the method in which the central processing device 70 in the bank card 7 is provided with a function which, if data translocation results in the duplication of data in the specified storage area, compares the priority order of data and erases the lower-order data.

Following the foregoing process, the data unification process is completed, and the bank card 7 with of Mr. C's wife is given to Mr. C (step 908), and the other card 6 is returned to the bank (step 909).

Figure 18:
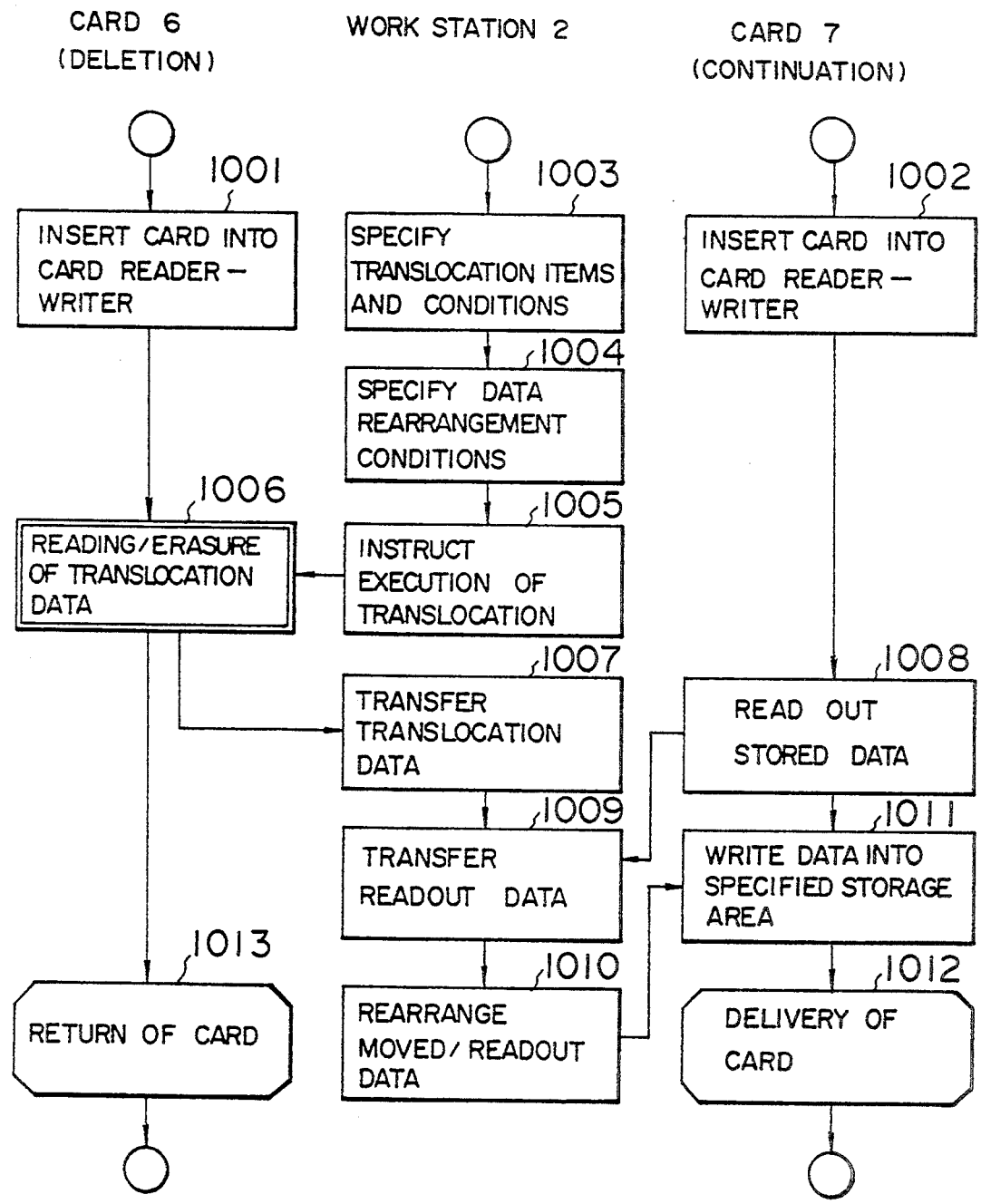

In the above embodiment, data translocation from the bank card 6, which is going to be cancelled to the card 7 which will be used continuously, may take place in the form of adding data to data which is already stored in the storage device 77 of the card 7, or may take place in such a way that the job processing section 23 of the work station 2 is provided with a function of moving the translocation data from the card 6 and data held in the card 7 to the work station 2 temporarily and rearranging these data in accordance with a specified order (sorted in time, classified by payee of depositing money, classified by money transfer destination, etc.) The rearranged data is stored in the storage device 77, as shown in FIG. 18.

In case there is no data stored in the data transfer destination in advance, a method may be such that data in a plurality of cards are stacked in the work station during the translocation and, after being rearranged in a specified order, stored in the storage device of the target card (steps 1001–1013).

Consequently, data distributed in a plurality of cards can be collected into one card quickly without the occurrence of negligence or misuse.

(9) Example of data division by translocation

Figure 19:
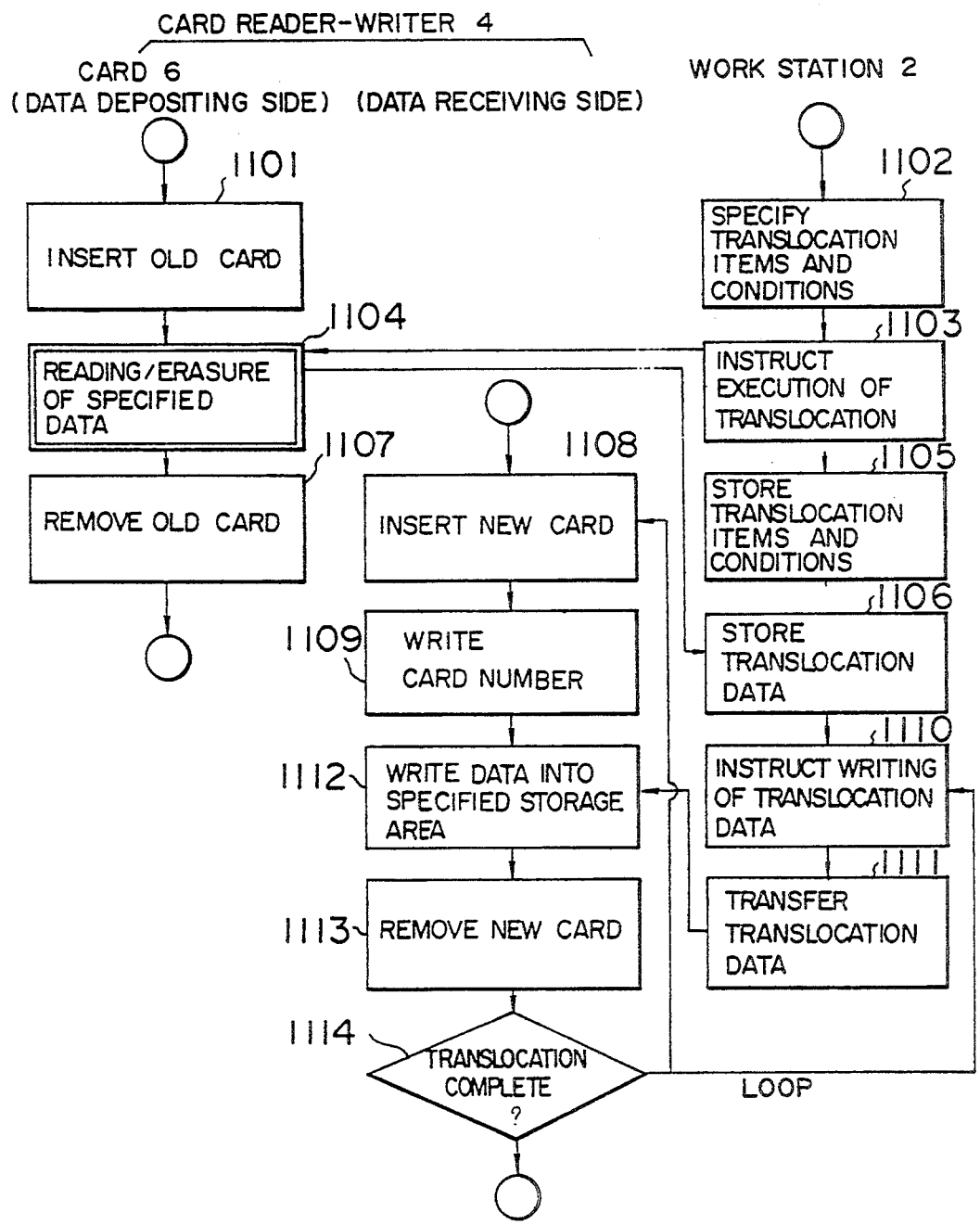

FIG. 19 shows an example of the use of the data translocation function for storing data in a card into a plurality of cards.

A research staff person D uses the IC card as a storage medium for crude data collected in a clinical examination. The data card 6 already stores mass data of multiple items. The category and quantity of data is expected to increase steadily. Data of this kind needs to be treated with care.

The research staff person D decides to classify the content of data into three major groups and store the data in three IC cards separately. The staff person D determines to use new IC cards with different labels for the three data cards and alter the storage areas for data items in the storage device of each card for easy use. The old card which has been previously used will be used for other purpose.

The research staff person D first inserts the source data card 6 into a card reader-writer 4 connected to a data analyzing work station 2 installed in the laboratory (step 1101). The translocation service program 231 is loaded in the job processing section 23 of the work station 2.

Next, the staff person D enters on an input unit 201 the data destination card number, data translocation items, storage area of translocation data, and translocation condition (in this embodiment, the condition is that all data is stored temporarily in the work station and thereafter it is written to storage devices of cards which are inserted sequentially into the card reader-writer in correspondence to the card number of the cards) (step 1102). These translocation items and conditions are displayed on a display unit 202.

In response to the instruction of execution of translocation on the input unit 201 (step 1103), the specified items and conditions of translocation are stored temporarily together with the translocation data in the work station 2 (steps 1104, 1105 and 1106). At this stage, the data which has been stored temporarily in the work station 2 is erased from the source data card 6.

The research staff person D removes the old card 6 from the card reader-writer 4 (step 1107), and inserts one of three new target cards selectively in place of the old card (step 1108).

The research staff person D writes a card number for identifying the newly inserted card using the input unit 201 (step 1109). Subsequently, when the research staff person D executes writing of the translocation data to the new card (step 1110), relevant data among the data stored temporarily in the work station 2 is written into the storage device of the new card in accordance with the specified items and conditions (steps 1111 and 1112), and data translocation to the card completes (step 1113).

Data translocation to the successive new cards is carried out by repeating the procedures from step 1107 to step 1111 (step 1114). As a result, all the data stored in the old card is stored in three cards in accordance with the prior specification.

The foregoing embodiment may be modified such that a plurality of card reader-writers are connected to the work station 2, and the source data card 6 which contains data is inserted into one of them, with new target cards being inserted individually into the remaining card reader-writers, so that data translocation is carried out in a parallel fashion.

Alternatively, for a plurality of cards on the data depositing side, cards are inserted sequentially or in parallel into card reader-writers so that the translocation items and conditions and data to be translocated are stored temporarily in the work station 2. Thereafter cards on the data receiving side are inserted into card reader-writer(s), sequentially or in a parallel fashion, thereby to carry out data translocation.

Consequently, data from one card on the data depositing side is moved, while being divided and sorted, to a plurality of cards accurately without the occurrence of dispersion or error in classification.

(10) Example of translocation accompanied by calculation

Figure 20:
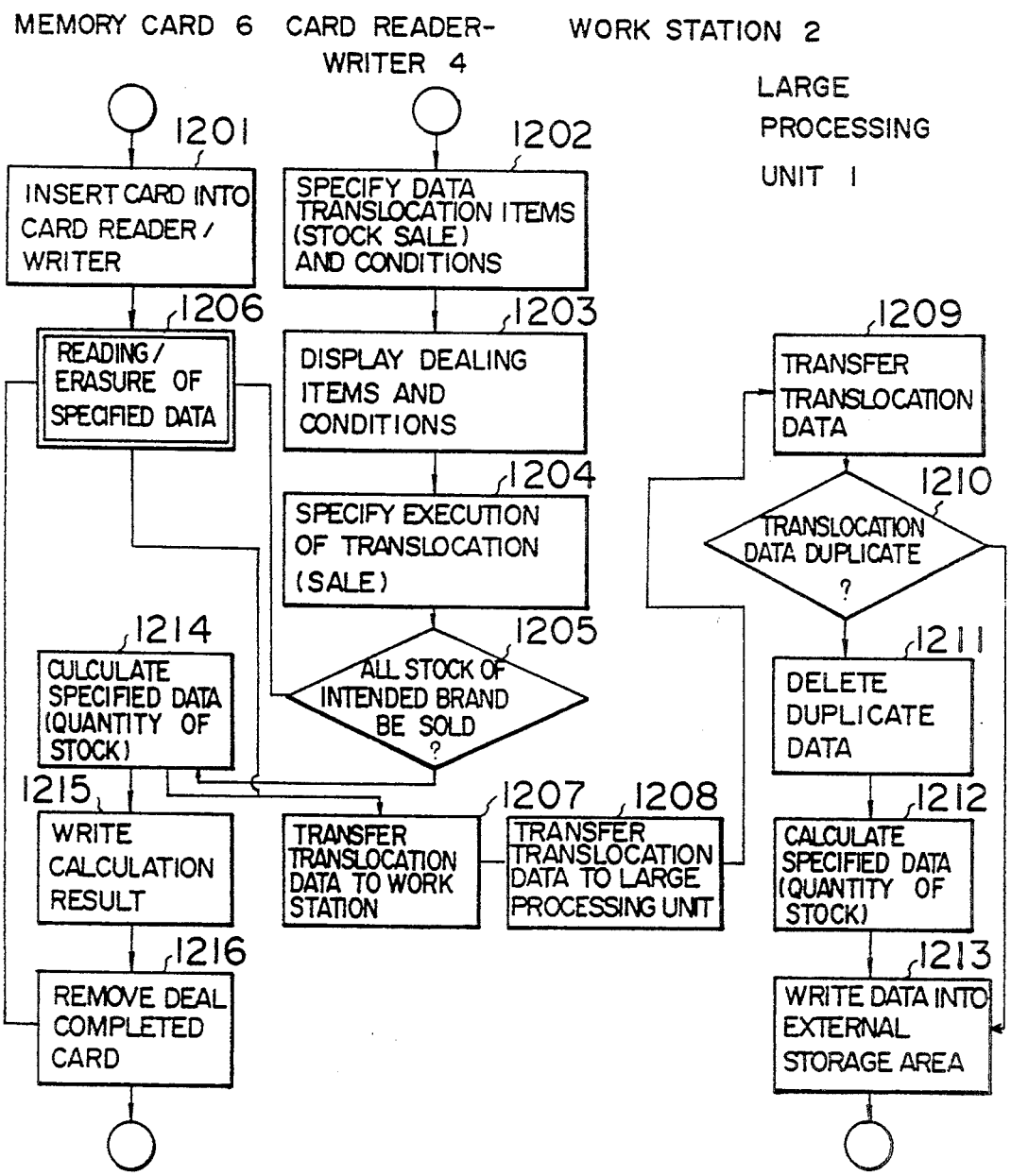
Figure 21:
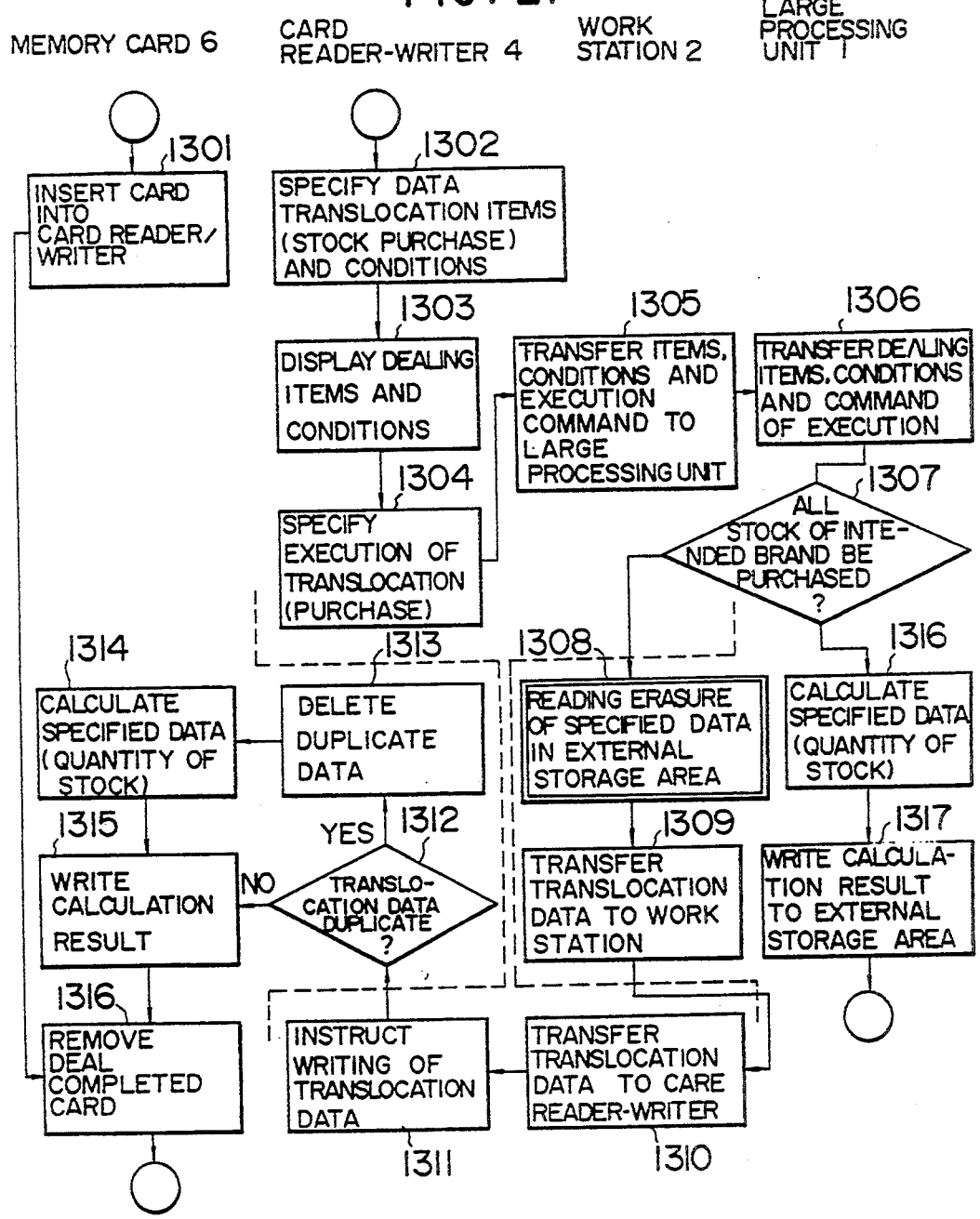

FIGS. 20 and 21 show an embodiment of this invention in which data translocation is accompanied by the calculation process.

A securities company W uses an IC card as a security card for transactions with individual customers.

The security card is used to store stock, certificate of deposit for safe custody, and certificate of dealing record, and in addition it has a role as a medium of transaction for an individual customer in trading stocks and bonds of various companies handled by the securities company W.

An individual customer who intends to trade any of these stocks and bonds goes to a local office of the securities company with the security card in his (or her) hand, and transacts by using the automatic stock/bond dealing machine installed in the office.

The automatic stock/bond dealing machine is unitary equipment comprising a work station 2 and a plurality of card reader-writers, and is connected to a large processing unit 1 which controls security transactions of all local offices. The large processing unit 1 has an external storage area for storing the history of transactions with individual customers and the quantity of stocks and bonds classified by brand.

For example, in a case where the individual customer is going to trade stock using the security card, he can sell his stock recorded on the security card and buy the stock of other brand based on this capital. Moreover he can trade the stock arbitrarily within a credit limit which is determined by the securities company for each individual customer depending on the market value of the stock possessed by the individual customer.

Assuming that an individual customer E intends to sell the stock of one brand among the stocks that are deposited for safe custody in the securities company W, he goes to a local office of the company and determines a brand and the quantity of stock to be sold or bought by viewing the brand-classified market prices on the market price board in the office.

FIG. 20 Shows the process of selling securities based on the security card.

The customer E inserts the security card 6 into the card reader-writer 4 of the automatic stock/bond dealing machine (step 1201), and specifies items and conditions such as the brand name for selling, the quantity of stock and the limit price on the input unit 401 (step 1202).

The work station 2 incorporated in the automatic stock/bond dealing machine has the same values as those displayed on the market price board. The display unit 402 displays the amount of sale (or amount of purchase), the commission, the tax amount, etc. (step 1203).

The customer, on approving this deal, executes the deal on the input unit 401 (step 1204).

In the case where the customer E has sold all brands that he had (step 1205), the instruction of the deal taken by the customer is followed by the functions of the translocation service program 231 of the automatic stock/bond dealing machine and the translocation program 66 in the security card 6, in which the whole data related to the specified brand, including the name and the quantity of stock, is erased from the storage device 67 on the security card 6 (step 1206), and the data is sent by way of the work station 2 (steps 1207 and 1208), and stored in the external storage area of the large processing unit 2 (steps 1209 and 1212).

In the case where the external storage area of the large processing unit I already stores the name and quantity of stock of that brand (step 1210), the central processing unit in the large processing unit erases the transferred brand name when data is sent from the security card 6 to the large processing unit by way of the work station 2 (step 1211). Only the quantity of stock is added to that of the relevant brand (step 1212) and the result is stored (step 1213).

In the case where the customer sells part of stock in quantity (step 1205), the central processing device 60 on the security card 6 performs the subtraction of stock of the pertinent brand (step 1214), and the result is stored in the storage device 67 (step 1215). In this case, the name of the sold brand transferred to the large processing unit 1 is treated as a simple transcription in data processing in the security card 6, and is not erased in its original storage area of the storage device 67. Even in this case of transcription, if the name of the same brand is held in the external storage area of the large processing unit I as mentioned previously, the data (brand name) transferred for transcription is erased at the transfer to the large processing unit 1.

Through the foregoing process, the sale of stock based on the security card is completed (step 1216).

Next, FIG. 21 shows the process of buying stock.

The purchase of stock using the security card 6 causes data translocation from the external storage area of the large processing unit 1 to the security card 6, as opposed to the sale of stock (steps 1301–1317). Also in this case, if part of stock is left in the external storage area of the large processing unit 1, data processing which takes place in the large processing unit 1 is transcription.

In the case of concurrent sale and purchase of stock, the processes of FIGS. 20 and 21 take place in a multiplexed fashion through the automatic stock/bond dealing machine, and the clearing result of the deal is recorded in the security card.

The clearing by means of the automatic stock/bond dealing machine is done by bringing the security card to the relevant counter of the office. The automatic stock/bond dealing machine may have a clearing function like the ATM (Automated Teller Machine).

In the foregoing embodiment, the external storage area 25 of the work station 2 which may be used in place of the external storage area 25 of the work station 2 may be used in place of the external storage area of the large processing unit 1.

Data translocation may be performed in a system in which a plurality of card reader-writers incorporated in the automatic stock/bond dealing machine are connected mutually through the central processing unit 20 of the machine so that customers can deal directly with each other for stock held in their security cards. Dealing of this case causes data translocation (or transcription) between security cards. The securities company intervenes among customers by providing customers with the opportunity of deal and the use of dealing facilities, and collecting the tax and commission at the settlement of deal.

In order for a customer to deal at home or office, data translocation may be performed in a system configuration in which an automatic stock/bond dealing machine comprising a card reader-writer 4 and a work station 2 is installed in the residence or office of the customer and connected to the large processing unit 1 of the securities company through a public line 11.

This system enables the terminal operator to carry out easily and promptly data translocation between an IC card and a different CPU and data translocation in which transcription and calculation process are included.

Figure 22:
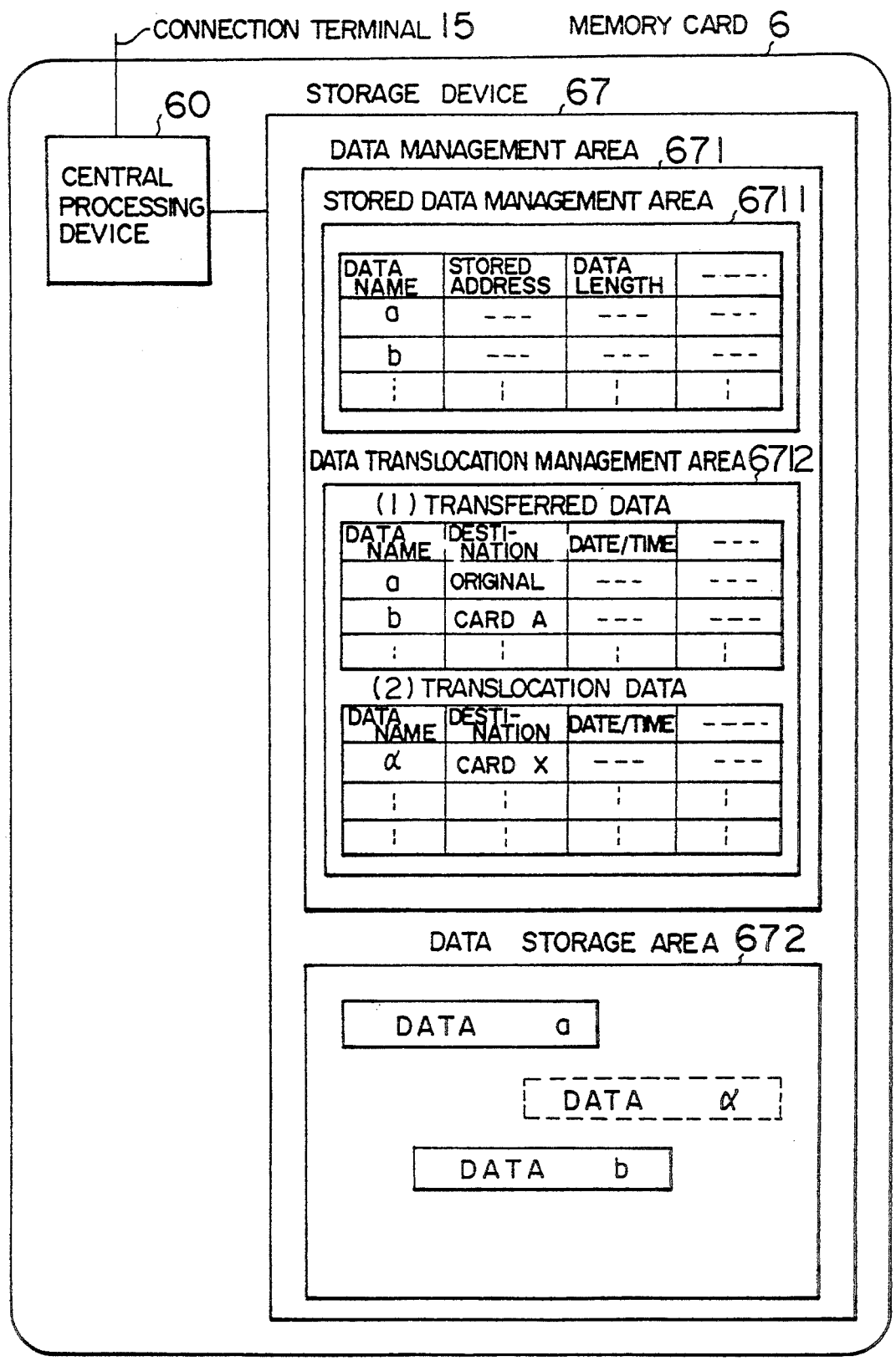
FIG. 22 is a diagram showing an example of the arrangement of the inside of the memory card.

(11) Example of translocation, with the history of data translocation being recorded FIG. 22 shows, in connection with the foregoing embodiments, a method of recording the history of data translocation in the storage device on the data depositing side and the storage device on the data receiving side.

The storage device 67 in the memory card 6 includes a data management area 671 used for the management of data translocation and a data storage area 672 used for storing data.

Among these areas, the data management area 671 includes a stored data management area 6711 and a data translocation management area 6712.

The stored data management area 6711 stores information such as names, codes, stored addresses and data lengths of data to be stored in the data storage area 672 and is used for managing the status of data stored in the data storage area.

The information stored in the stored data management area 6711 may be moved to the data destination along with the translocation of data in the data storage area 672 according to the translocation service program 231 of the work station 2 and the translocation program in the memory card 6, or it may be erased from the stored data management area 6711, instead of being moved to the data destination.

The data translocation management area 6712 records information related to translocation such as the destination, source, date and operator of data translocation for data to be stored in the data storage area 672 in accordance with the specification of the translocation items, conditions and the instruction of execution, thereby implementing the management of the data translocation history.

The data translocation management area 6712 may be designed to record the history of data transcription, erasure, read-out, etc. In addition to the history of translocation.

In the example of FIG. 22, among data in the data storage area 672, data a is the source data which was created and entered at the beginning of the operation, and data b was translocated from other card A. Data e was moved to other card X and is erased from the card. This data has its status recorded in the stored data management area 6711 and has its translocation history recorded in the data translocation management area 6712.

By providing the above-mentioned functions for the storage device 67 of the memory card 6, it becomes possible to prove the data translocation, trace the location of data, and prevent the dispersion and illegal use of data.

According to this invention, data processings including the reading of data out of a memory, erasure of the data from its original storage area, and writing of the readout data into the storage area of a specified memory can be implemented easily and promptly.

We claim:

1. A data processing system comprising:
    a host computer;
    a processing apparatus comprising means for outputting to a memory card a move command for transferring data from said memory card to said processing apparatus, means for storing data transferred from the memory card and means for transferring data from the processing apparatus to the host computer; and
    said memory card comprising a non-volatile memory for storing said data, means for receiving said move command, means for reading and transferring a predetermined length of data from said non-volatile memory to said processing apparatus and means for annulling said predetermined length of data from said non-volatile memory wherein in response to said move command from said processing apparatus, the predetermined length of data is erased from the non-volatile memory before the predetermined data is transferred to the host computer.

2. A data processing system according to claim 1, wherein said move command is outputted by a program executed in said processing apparatus.

3. A data processing system according to claim 1, wherein said means for reading, transferring and annulling is a program executed in said memory card.

4. A data processing system according to claim 1, wherein said processing apparatus is a work station including a processor and a card-reader-writer which outputs said move command.

5. A data processing system according to claim 4, further comprising:
    another work station connected to said work station through a communication line;
    another card-reader-writer connected to said another work station; and
    another memory card connected to said another card-writer-reader,
    wherein said work station transfers said predetermined length of data from said memory card to said another memory card via said communication line, said another work station and another card-reader-writer.

6. A data processing method for transferring data in a memory card comprising the steps of:
    inputting to said memory card a command which requires transferring said data to a device external of said memory card;
    transferring said data to said external device of said memory card and annulling said data in said memory card after said data is transferred in response to said command; and
    transferring said data from the external device to another memory after said data is annulled from the memory card.

7. A data processing method according to claim 6, wherein said inputting step and said transferring and annulling steps are executed in cooperation between said memory card and a work station.

8. A data processing method according to claim 6, wherein said inputting step said transferring and annulling steps are executed in cooperation among said memory card, a work station and a card-reader-writer.

9. A data processing method according to claim 6, wherein said inputting step, said transferring step and annulling step are executed in cooperation between said memory card and a work station.

10. A data processing method according to claim 6, wherein said another memory is in another memory card.

11. A data processing method according to claim 6, further comprising the step of transferring said data from the external device to further another memory after said data is annulled from the memory.

12. A data processing method according to claim 11, wherein said steps of transferring said data from the external device to said another memory and said further another memory are executed in parallel.

13. A data transferring method according to claim 6, further comprising the steps of:
    inputting to another memory card another command which requires transferring another data in said another memory card to a second device external of said another memory card;
    transferring said another data to the second external device of said another memory card and annulling said another data in said another memory card after said another data is transferred to the second external device in response to said another command;

processing said data and said another data in a predetermined manner; and storing said processed data into said memory card.

14. A data processing method according to claim 6, further comprising the steps of:

inputting to another memory card another command which requires transferring another data in said another memory card to a second device external of said another memory card;

transferring said another data to said second external device of said another memory card and annulling said another data in said another memory card after said another data is transferred to the second external device in response to said another command;

processing said data and said another data in predetermined manner; and storing said processed data into further another memory card.

15. A data processing method according to claim 6, wherein said inputting step and said transferring and annulling steps operate on data of arbitrary length.

16. A data transferring method for transferring data so that the data does not exist simultaneously in a plurality of memory places, comprising the steps of:

designating a first place of said memory places in which data to be transferred is stored;

designating a second place of said memory places to which said data is to be transferred;

transferring said data from the first place to an intermediate place, when said second place is designated;

annulling said data from said first place, when said second place is designated; and storing said data into said second place, when said second place is designated.

17. A data transferring method according to claim 16, wherein at least one of said first place and said second place is provided in a memory card.

18. A data transferring method according to claim 16, wherein said first place, said second place and said intermediate place are provided in a memory device.

19. A data processing system comprising:

means for inputting to a memory card a command which requires transferring predetermined length of data in said memory card to a processing apparatus;

means for transferring said predetermined data to said processing apparatus;

means for annulling said predetermined data in said memory card in response to said command;

means for transferring said predetermined data to another processing apparatus from said processing apparatus through a communication network or signaling line after said predetermined data is annulled in said memory card;

means for writing said predetermined data into another memory card from said another processing apparatus; and means for delivering said another memory card in response to an inputting of a correct account number of said memory card.

20. A data processing system according to claim 19, wherein said memory card is a bank card.

21. A data processing method for transferring data in a memory card comprising the steps of:

inputting to a memory card a command which requires transferring predetermined data in said memory card to a processing apparatus;

transferring said predetermined data to said processing apparatus;

annulling said predetermined data in said memory card, in response to said command;

transferring said predetermined data to another processing apparatus from said processing apparatus through a communication network or a signaling line after said predetermined data is annulled in said memory card;

writing said predetermined data into another memory card from said another processing apparatus; and delivering said another memory card in response to an inputting of a correct account number of said memory card.

22. A data processing system according to claim 21, wherein said memory card is a bank card.

* * * * *